(12) United States Patent
Goodman

(10) Patent No.: US 9,298,513 B2
(45) Date of Patent: Mar. 29, 2016

(54) METHOD AND STRUCTURE FOR AUTONOMIC APPLICATION DIFFERENTIATION/SPECIALIZATION

(75) Inventor: Brian Daniel Goodman, New York, NY (US)

(73) Assignee: International Business Machines Corporation, Armonk, NY (US)

(*) Notice: Subject to any disclaimer, the term of this patent is extended or adjusted under 35 U.S.C. 154(b) by 1926 days.

(21) Appl. No.: 10/959,176

(22) Filed: Oct. 7, 2004

(65) Prior Publication Data

US 2006/0080657 A1    Apr. 13, 2006

(51) Int. Cl.
*G06F 9/50* (2006.01)
*G06F 9/54* (2006.01)

(52) U.S. Cl.
CPC .............. *G06F 9/5061* (2013.01); *G06F 9/542* (2013.01); *G06F 2209/505* (2013.01)

(58) Field of Classification Search
USPC ...................... 709/209–211; 714/4
See application file for complete search history.

(56) References Cited

U.S. PATENT DOCUMENTS

| | | | | |
|---|---|---|---|---|
| 3,631,648 A * | 1/1972 | Filipek | ................. | E04B 1/3511 52/745.03 |
| 4,814,984 A * | 3/1989 | Thompson | ............. | G06F 13/376 709/209 |
| 5,121,345 A * | 6/1992 | Lentz | ..................... | G06F 21/575 713/188 |
| 5,136,708 A * | 8/1992 | Lapourtre | ............. | G06F 9/5055 709/203 |
| 5,640,504 A * | 6/1997 | Johnson, Jr. | ............ | H04L 29/06 713/2 |
| 6,363,416 B1 * | 3/2002 | Naeimi | ................... | H04L 41/30 709/209 |
| 6,434,131 B1 | 8/2002 | Sari | | |
| 6,529,966 B1 * | 3/2003 | Willman | ............... | G06F 9/4411 710/10 |
| 6,536,037 B1 * | 3/2003 | Guheen | ..................... | G06F 8/71 703/2 |
| 6,539,385 B1 | 3/2003 | Pollack et al. | | |
| 6,763,456 B1 * | 7/2004 | Agnihotri | ............ | G06F 11/0748 709/222 |
| 6,889,338 B2 * | 5/2005 | Srinivasan et al. | ................. | 714/4 |
| 7,120,690 B1 * | 10/2006 | Krishnan | ............ | G06F 17/30575 707/999.2 |
| 7,203,937 B1 * | 4/2007 | Kyle | ........................ | G06F 8/60 709/222 |
| 7,421,478 B1 * | 9/2008 | Muchow | ........................ | 709/209 |
| 8,601,099 B1 * | 12/2013 | Zenz | ................... | H04L 41/0813 709/220 |
| 2002/0059390 A1 | 5/2002 | Fletcher et al. | | |
| 2002/0065879 A1 * | 5/2002 | Ambrose | .................. | G06F 9/50 709/203 |
| 2002/0196779 A1 | 12/2002 | Khadri et al. | | |
| 2002/0198877 A1 | 12/2002 | Wolff et al. | | |
| 2003/0023580 A1 * | 1/2003 | Braud | ..................... | G06Q 50/22 |
| 2003/0027560 A1 | 2/2003 | Jammal | | |
| 2003/0037283 A1 * | 2/2003 | Srinivasan | ................ | H04L 1/22 714/11 |
| 2003/0126090 A1 | 7/2003 | Fukuoka et al. | | |
| 2003/0140058 A1 * | 7/2003 | Martin | ............. | G06F 17/30569 |
| 2003/0149735 A1 * | 8/2003 | Stark | ....................... | H04L 67/16 709/208 |
| 2003/0200271 A1 | 10/2003 | Hejl | | |
| 2003/0229717 A1 | 12/2003 | Teague | | |
| 2004/0019896 A1 * | 1/2004 | Yu | .......................... | G06F 9/4411 719/321 |
| 2004/0054807 A1 | 3/2004 | Harvey et al. | | |
| 2004/0055002 A1 * | 3/2004 | Das | ....................... | G06F 9/5055 718/107 |
| 2005/0014467 A1 * | 1/2005 | Ishiwata | ................ | H04W 84/20 455/39 |

(Continued)

*Primary Examiner* — Backhean Tiv
(74) *Attorney, Agent, or Firm* — Daniel P. Morris; McGinn IP Law Group, PLLC

(57) ABSTRACT

A method (and structure) of at least one of implementing, for deploying, an enterprise application, includes, for the set of instructions defining the enterprise application, a mechanism that allows the enterprise application to autonomously exercise at least one of a node differentiation and a task specialization.

31 Claims, 12 Drawing Sheets

(56) References Cited

U.S. PATENT DOCUMENTS

| | | | |
|---|---|---|---|
| 2005/0021831 A1* | 1/2005 | Andrzejak | G06F 17/30115 709/235 |
| 2005/0033844 A1* | 2/2005 | Andrzejak | G06F 9/5066 709/226 |
| 2005/0044067 A1* | 2/2005 | Jameson | G06F 17/30115 |
| 2005/0071842 A1* | 3/2005 | Shastry | G06F 9/5038 718/100 |
| 2005/0108274 A1* | 5/2005 | Selman | H04L 67/02 |
| 2005/0144610 A1* | 6/2005 | Zenz | G06F 9/5011 717/168 |
| 2005/0193229 A1* | 9/2005 | Garg | G06F 11/1482 714/4.1 |
| 2006/0015505 A1* | 1/2006 | Henseler | G06F 9/50 |
| 2006/0041644 A1* | 2/2006 | Henseler | G06F 9/44526 709/220 |
| 2006/0080657 A1* | 4/2006 | Goodman | G06F 9/5061 717/177 |
| 2010/0148940 A1* | 6/2010 | Gelvin | H04L 67/12 340/286.02 |

\* cited by examiner

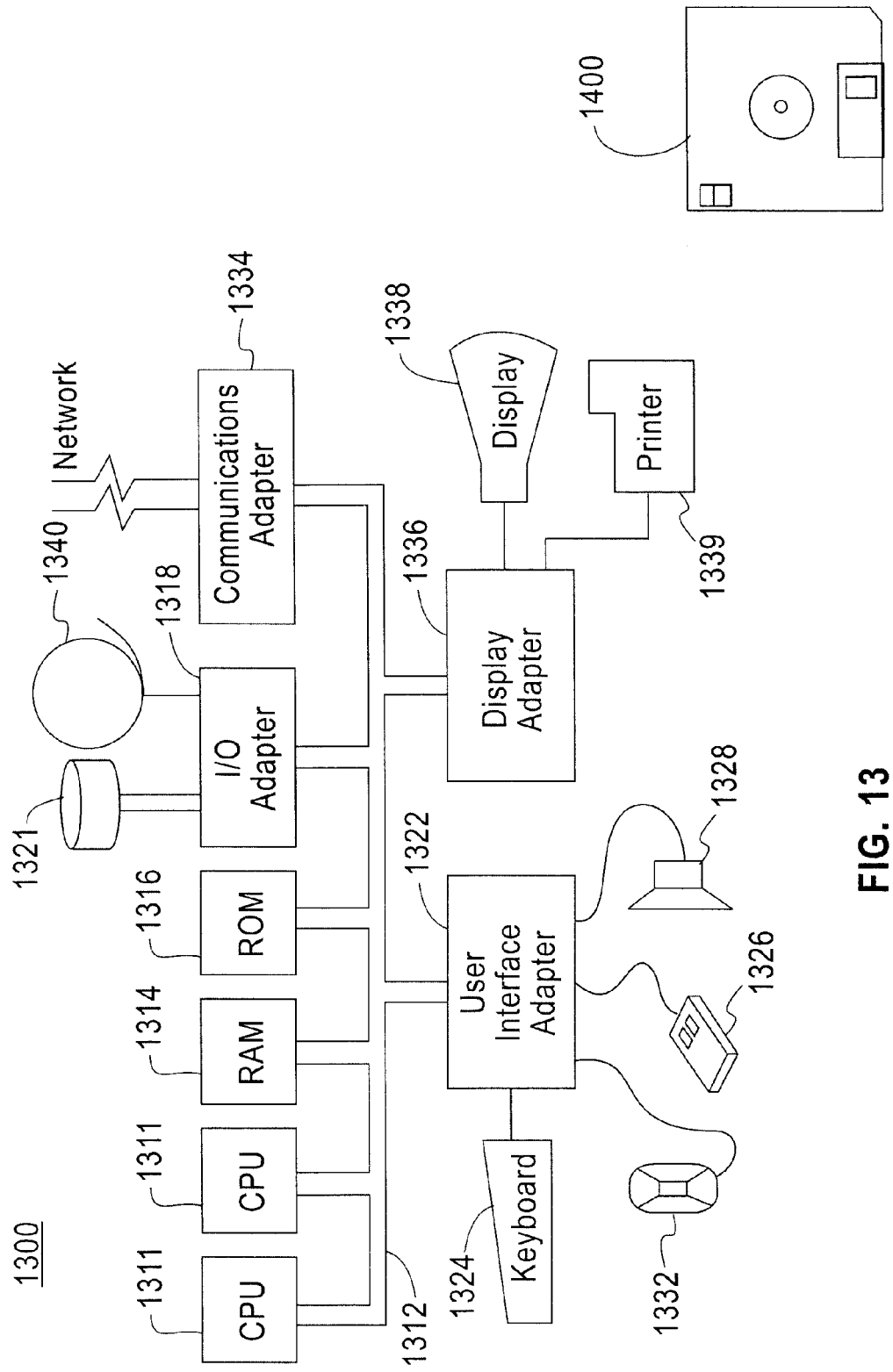

METHOD AND STRUCTURE FOR AUTONOMIC APPLICATION DIFFERENTIATION/SPECIALIZATION

BACKGROUND OF THE INVENTION

1. Field of the Invention

The present invention generally relates to development, deployment, and management of enterprise tiered applications in which multiple instances of the same code and configuration are deployed, typically on separate machines connected on a network. More specifically, an agreed-upon election process, extensible configuration capability, and task allocation message format allow autonomic application differentiation for leader election, which leader thereinafter assigns configuration(s) and tasks among the multiple instances of currently-deployed code modules.

2. Description of the Related Art

Modern application architectures and frameworks have provided some common development, deployment, and management capabilities. However, enterprise applications, in particular, have challenges to provide a consistent level of service to a specified number of users at an acceptable level of performance.

Java 2 Enterprise Edition (J2EE)™ is a Java™ runtime environment primarily designed, developed and supported by Sun Microsystems. It was specifically architected to support enterprise tiered application development, deployment, and management.

For purposes of the discussion hereinbelow, "enterprise application" or "enterprise-capable application" refers to an application designed to be distributed so that potentially a plurality of such identical modules are simultaneously deployed. Enterprise applications might be deployed to multiple machines but a single machine can also have multiple deployments at the same time. An enterprise application typically serves a large audience of consumers, users, machines or potentially other applications, although the actual size of an audience at any one time is not to be considered a limitation of the present invention. As implemented on a computer or computer network, an enterprise application can be considered as a look-alike software module.

FIG. 1 shows an exemplary functional diagram of a conventional enterprise application deployment 100 relating to, for example, one or more data sources 101, as interconnected functionally by the dotted lines 102, 103. The components 104-107 might be hardware components, such as servers, but more typically for purpose of this discussion, would be software enterprise applications respectively located in separate physical component or even a single component, such as a server 104. Server 104 might, for example, serve as an entry for users into the data sources 101 via a computer network (not shown), such as the Internet. Messaging hub 107 serves as a communication center that appropriately forwards messages between the nodes.

Assuming application servers 105, 106 as being enterprise applications, then it can be seen that each application server 105, 106 could be further comprised of submodules, such as a web application module 108, a web service 109, and an EJB module 110. Enterprise JavaBeans™ (EJB) technology is the server-side component architecture for the Java 2 Platform, Enterprise Edition (J2EE) platform. EJB technology enables rapid and simplified development of distributed, transactional, secure and portable applications based on Java™ technology. Therefore, as exemplarily shown in FIG. 1, there are at least two implemented enterprise applications 105, 106 at the same time in this example.

Typically, an enterprise application will have a primary function, but is often exposed to other secondary functions and to other applications. For example, each enterprise application 105, 106 might have a primary function to provide a single point of access to manage telephone contacts and/or other emergency contacts for employees of a company. However, this same enterprise application 105, 106 might also be used to provide other services or functions that allow other applications to leverage the information and/or software code used to support the primary function.

For example, a secondary function of enterprise application modules 105, 106 might be exposing the telephone and emergency contact information to another application residing on application servers 105,106 that defines emergency procedures to be followed as predefined company policy for handling emergencies. The emergency procedure application on application servers 105, 106 consumes data via a web service, remote EJB, or other communication from the emergency contact management application also on application servers 105,106. Both the first application and the second application can be considered as an enterprise application for purpose of this discussion.

In general, enterprise applications require architectures that support two main types of scaling, vertical and horizontal. Vertical scaling is when an application is deployed on the same hardware to maximize utilization of available resources. Horizontal scaling, which is more popular, is more often used to achieve redundancy and higher performance for overall reliability.

In both cases of scaling, application components are typically literally deployed on multiple machines. Each copy represents a set piece of function designed to operate exactly like each other. This architecture is currently exemplified by Java J2EET™. J2EE™ web applications provide a single manageable bundle for development and deployment, and this feature has simplified both development and deployment of application components.

Applications are often deployed in layers to provide more options for scalability. For example, there might be a need to have more web servers (serving static content) than web application servers (dynamic content). Legacy and maintenance components are often deployed as one-off solutions. These components often fail to leverage the benefits of a single bundle development and deploy architecture like J2EE™.

Although modular application architecture, development and deployment provide efficiencies over past systems, there are often several components managed outside of the application design. This divergence will continue to grow over time.

That is, enterprise applications often require dedicated independent components which are managed apart from the main application. Currently, skilled human involvement is usually required to manage and maintain such systems. Without some method of oversight, the multiple instances can work against each other, causing problems such as data corruption or poor performance. The multiple instances might, for example, poise the risk of task collision and might introduce additional unwanted network traffic or database activity.

Therefore, for application architecture, scalability is often addressed by creating layered architecture and employing the use of horizontal scaling, that is, essentially throwing hardware at the problem.

There are components that do not fit within these frameworks. Specifically, legacy systems and maintenance applications are two areas that architectures and frameworks tend to ignore. These items are often deployed as one-off solutions without much care to scalability and reliability. It is not uncommon for this approach to introduce unsynchronized code branches, duplication of effort, etc., everything that one might expect by introducing multiple work streams to address an overall solution.

One of the reasons they are deployed as stand-alone applications has to do with there being no common way to scale horizontally and automatically have parts of the deployment perform specialized tasks (e.g., without human intervention, such as using configuration files). This problem is compounded should it be necessary or desirable to modify or redefine the specialized task to be performed.

Thus, a need continues to exist for improvement in the implementation of modular application architecture.

SUMMARY OF THE INVENTION

In view of the foregoing, and other, exemplary problems, drawbacks, and disadvantages of the conventional system, it is an exemplary feature of the present invention to provide a method that enables applications to be developed, deployed, and managed in a common fashion such that autonomic capabilities can be utilized to modify application characteristics at runtime in a coordinated and reliable manner.

It is another exemplary feature of the present invention to provide an automatic and autonomic manner that allows interconnected enterprise applications to coordinate among themselves for purpose of specialization and differentiation.

It is another exemplary feature of the present invention to provide a technique in which enterprise applications can automatically and autonomously decide a leader among themselves, which leader has the function to positively assign each incoming specific task so that potential conflicts are precluded.

It is another exemplary feature of the present invention to provide a technique in which enterprise applications can automatically and autonomously have the tasks expected from an enterprise application to be modified in accordance with current need, that is, to automatically and autonomously change the configuration of an enterprise application.

To achieve the above exemplary features and others, in a first exemplary aspect of the present invention, described herein is a method (and structure) of at least one of implementing, for deploying, an enterprise application, including, in a set of instructions comprising the enterprise application, a mechanism allowing the enterprise application to autonomously exercise at least one of a node differentiation and a task specialization.

In a second exemplary aspect of the present invention, described herein is a signal-bearing medium tangibly embodying a program of machine-readable instructions executable by a digital processing apparatus to execute an enterprise application, the instructions including a mechanism allowing the enterprise application to autonomously exercise at least one of a node differentiation and a task specialization.

In a third exemplary aspect of the present invention, described herein is a computer including a speed of a central processing unit (CPU) and a random access memory (RAM) storing a set of machine-readable instructions being executed by the CPU, wherein the set of machine-readable instructions includes an enterprise application, and the enterprise application further includes a mechanism allowing the enterprise application to autonomously exercise at least one of a node differentiation and a task specialization.

In a fourth exemplary aspect of the present invention, described herein is a method for differentiating, in an autonomic fashion, one of a plurality of nodes of identical makeup on an interconnected system, including connecting to a common message bus; transmitting a message on a common message bus to establish a presence and to determine a current environment; conducting an election process to determine a primary node among the plurality of nodes; and sending a configuration message to all the nodes currently connected to the common message bus.

In a fifth exemplary aspect of the present invention, described herein is a method for detecting leader failure through distributed monitoring, including a first node and a second node each respectively detecting a third node as being a leader node; the first node independently monitoring the third node by requesting a presence indication; the second node independently monitoring the third node by requesting a presence indication; the second node determining that the presence of the third node has been compromised; and the second node communicating to other nodes, including the first node, of the new state that the third node is compromised.

In a sixth exemplary aspect of the present invention, described herein is a method of holding an n-way election using a publish/subscribe bus, including a first node connecting to the publish/subscribe bus; a second node connecting to the publish/subscribe bus; the first node initiating an election over the publish/subscribe bus; the second node and a third node receiving the election message over the publish subscribe bus; the first node, the second node, and the third node sending messages over the publish/subscribe bus; and determining individual nodes of a greater connected whole by using an algorithm held on each node.

In a seventh exemplary aspect of the present invention, described herein is method of deploying multiple instances of substantially identical code modules, including, in each code module, providing specific code instructions for an agreed-upon election process, an extensible configuration capability, and a task allocation message format, wherein the specific code instructions provide an autonomic application differentiation for a leader election, and an elected leader thereinafter assigns configurations and tasks to all currently-deployed the multiple instances of substantially identical code modules.

In an eighth exemplary aspect of the present invention, described herein is a method of at least one of designing, implementing, and deploying an enterprise application, including, in a set of instructions comprising the enterprise application, a mechanism allowing the enterprise application to autonomously exercise at least one of a node differentiation and a task specialization.

Thus, the present invention provides improved deployment of enterprise application modules, such that these modules can autonomously be configured for differing tasks and to be uniquely designated to perform specific tasks.

In the context of the example shown in FIG. 1, the present invention provides a method so that the two enterprise applications 105, 106 can be automatically reconfigured, without need of a user intervention or a configuration file, and can be uniquely identified for specifically performing designated tasks. To achieve this result, each of the identical modules has a built-in election module so that one of the currently-deployed identical modules is elected to be a leader that has the role of controlling the automatic reconfiguration capability and allocating required tasks positively and uniquely to the various identical modules.

In a broader sense intended as being covered by the present invention, enterprise applications are not confined to software modules, and the concepts discussed herein are similarly not necessarily confined to software enterprise applications. Thus, for example, any machine, component, or application intended to target a large population of usage and that requires a robustness to reliably deal with such expected large population can benefit from the concepts of the present invention.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 13 illustrates an exemplary hardware/information handling system 1300 for incorporating the present invention therein; and FIG. 14 illustrates a signal bearing medium 1400 (e.g., storage medium) for storing steps of a program of a method according to the present invention.

DETAILED DESCRIPTION OF EXEMPLARY EMBODIMENTS OF THE INVENTION

Figure 1:
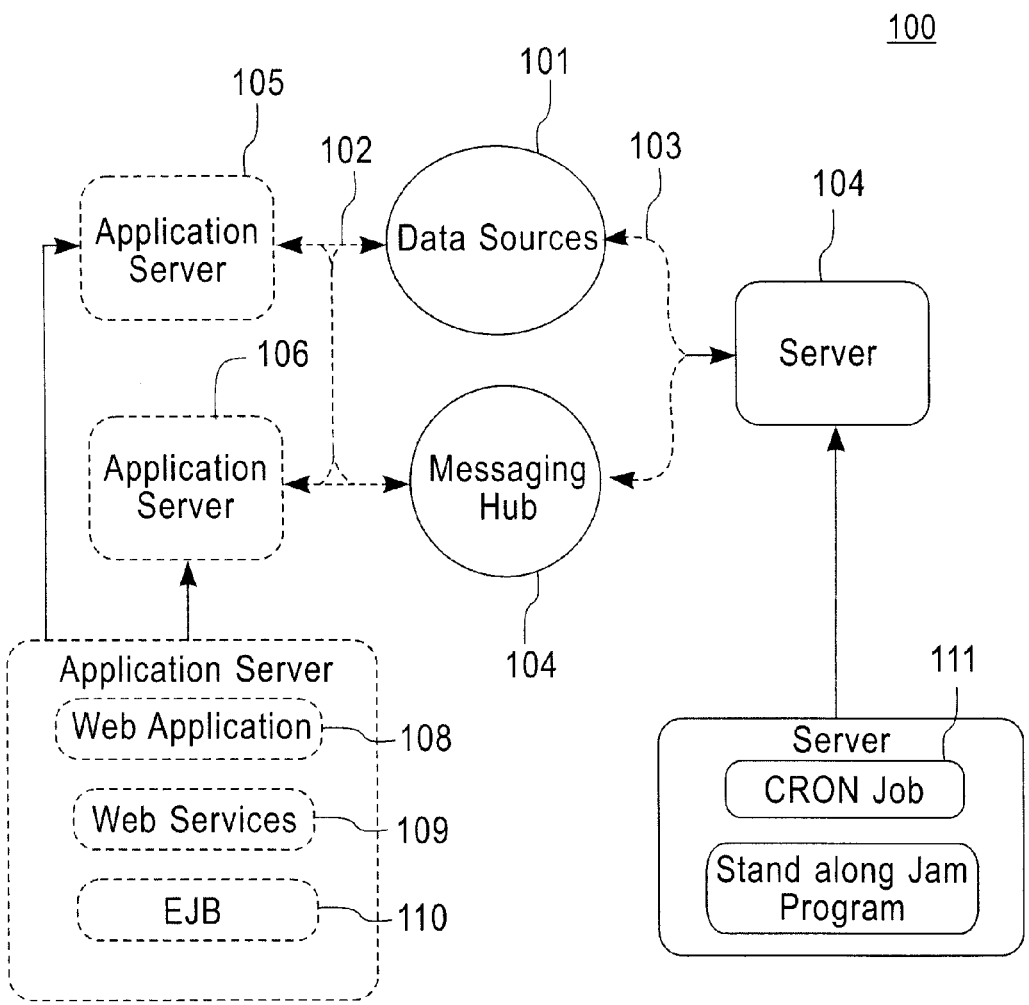
FIG. 1 shows a functional diagram of an exemplary conventional enterprise application deployment 100.

Referring now to the drawings, and more particularly to FIGS. 1-14, exemplary embodiments of the present invention will now be described.

It is noted that, even though an exemplary preferred embodiment of the present invention is explained in the environment of J2EE™, it is not intended to be limited to this environment. That is, it is submitted that one of ordinary skill in the art, after having read the details described herein and taking this disclosure as a whole, would readily be able to apply the present invention in other environments, both software and hardware.

An exemplary characteristic of the present invention is its ability to be incorporated into almost any environment in which there are modular components distributed over a system, each modular component being substantially equal to execute a primary task, but which task would benefit from having one of these modular components designated as a master module for executing the task, for at least one execution of the task. It will also be apparent from the following discussion that another key feature of the present invention is that the modules are also potentially capable of selectively changing their assigned tasks.

The present invention teaches that such modular components have included therein the capability to automatically and autonomously proceed to determine, among such modules currently active at any one time, a master module among themselves for purpose of taking leadership to positively make task allocations among the currently-active modular components. Exemplarily, each modular component has the capability to assume this role as the master module.

This specification describes a process, method and application code to achieve autonomic specialization and differentiation among enterprise applications. The architecture and design continue to support common development and deployment while providing reliable auto-negotiating runtime configuration, thereby enabling greater application autonomy and flexibility.

As used herein, "node differentiation" means that nodes, even though they might be based on essentially identical software modules, will still differ in details, such as node number, location, etc. "Task specialization" means that the essentially identical software modules are potentially designed such that different tasks can be designated for execution by different nodes. The term "configuration" means anything that a node interprets to distinguish itself and/or any modification or selection of specific code that the node must make in order to execute a task that it has been assigned. In addition, configuration changes internal to the modules, "configuration" also potentially involves the external configuration (e.g., the identification/location of the community of currently-active nodes), since nodes of the present invention are programmed to keep aware of the external environment, the state of the community, etc.

The present invention is both an architectural design and a functional method implementation addressing the basic need for alike-application modules to function differently in specific ways, in real time, and without human intervention.

Web applications are increasingly becoming the combination of front end and service integration points. Service integration points are interfaces to middleware and backend systems. They offer access to services and data that normally would go unpublished.

Many applications also integrate life cycle servlets to perform asynchronous tasks enabling the application to be both user-driven and application-driven. In order to provide service at the enterprise level, applications need support flexible scaling.

Life cycle servlets are not intended for the general end and often do not provide a user interface. Servlets can be used to hook into the overall web application environment to leverage the initialization, parameter management, startup sequencing and destruction methods. End users are the primary exploiters of web applications.

End-user-driven events might include a form submission. Web applications can drive events that trigger actions. Examples might include workflows or state monitors/alarms. The aspects of web applications driving events might be as simple as a web application server with a module called out as a life cycle servlet or agent that connects to a message queue server (work flow) or a pub/sub message server (alerting). State monitoring might simply be the agent or servlet setting a register to true after having detected a pre-specified condition. For example, in FIG. 1, the web application 108 in application servers 105, 106 might have servlets (not explicitly shown in the figure) that detect alerts to be forwarded to a message queue server in messaging hub 107.

Scaling a web application can be approached from many perspectives. Application architecture has the most impact on the overall application scalability. The architecture is often impacted by the scalability solutions provided by products.

For example, IBM WebSphere Application Server (WAS)™ is a J2EE™ environment. J2EE™ provides the notions of servlet containers, enterprise java beans, etc. WAS™ provides extra levels of work load management, clustering, etc., that go above and beyond the J2EE™ specification.

As previously mentioned, scalability can be addressed by deploying the application on more machines (horizontal scaling) or deploying the application multiple times on the same machines (vertical scaling). Horizontal scaling often increases the amount of IT (information technology) staff support. Horizontal scaling is more popular. The premise is that adding servers often allows the application to scale indefinitely. Costs increase in terms of management, hardware and physical footprint.

Vertical scaling takes the premise that most CPUs sit idle. By deploying an application multiple times on a single server there is better utilization of system resources. Without clever configuration, the server is limited by the network pipe. In contrast, horizontal scaling replicates all the resources over and over again.

Application architectures such as J2EE™ support the common development, deployment and management of server centric applications. Developers work in specified file structures. Deployment deliverables include modules created from the development structures. Managing the deployment modules maps directly to how the application is architected and implemented.

If the deployment requires multiple instances of the application, such as exemplified by application servers 105, 106 in FIG. 1, then each server is deployed with exactly the same code and configuration. This supports enhanced performance, failover, and load balancing. "Failover" means that, when a node stops performing adequately, another node takes its place. A "node" might be a server, service, application, module, and/or network connection, etc. "Performing adequately" is defined by a measurable condition such as response time, availability (e.g., "doesn't exist"), or work load (e.g., resource limited).

If the application requires some of the servers to be configured differently than the other servers, then a problem may arise, since manual configuration changes need to be made to differentiate the servers.

Consider, for example, a typical database driven web application similar in concept to that shown in FIG. 1. There might be, for example, four instances of a web application and two instances of a database server. A web application might store which database server to connect to in a property file. Storing the database server name in a property file is not the best idea, but it easily demonstrates the point.

If it is assumed, for example, that the deployment specification requires an equal split between web applications and database servers, there are two web applications for every database server. This configuration has obvious deployment and configuration implications.

From a scalability, failover, and performance perspective, it is possible for two nodes to be taken out of circulation, which in turn might burden one database server.

Currently, a manual configuration is often required to set a "switch" in a configuration file to enable a specific feature that needs to be controlled. Most applications require some data maintenance or synchronization. At other times, applications may require specific tasks, like generating emails based on a database query to be run.

These tasks are often broken out of the overall architecture as CRON jobs (e.g., item 111 in FIG. 1) or standalone programs. CRON is a popular UNIX program used to schedule and run other applications. The term "CRON job" is often used to mean any application, script or command that is executed based on a scheduler.

There are some major implications in developing these standalone solutions, as follows:
1) Duplication of effort
   a) Code reuse also means code replication and synchronization.
   b) Code reuse also means additional code distribution.
2) Dummy delegation
   a) Schedulers and scripts do not always know when something goes wrong.
   b) Schedulers rely upon server availability.
3) Limited visibility
   a) Standalone programs cannot easily display their current state.
   b) Standalone programs cannot easily provide sophisticated interaction.

Email is an easy common method to communicate state. However, it is often not real time and provides only one-way notification. Other methods, such as logs and custom server interfaces often require special consideration in terms of access and effort. Sophisticated interaction includes graphical user interface controls that enable system management.

Ideally, these standalone applications would be maintained as part of the common application components. Current architectures do not support this. More often than not, standalone solutions are built as additional sub-systems. That is, they share common code, but have the additional overhead of managing issues concerning source code versions, code deployments, reliability, availability (e.g., single point of failure) and overall management.

It is challenging to develop and manage code in a common way and still achieve task and configuration differentiation. Moreover, it is difficult to deploy common code and make each instance behave independently, with autonomy and limited human participation. The present application demonstrates an architecture pattern, method, and implementation that resolve these issues.

Thus, the present invention describes an architecture, method and functioning system enabling applications to exhibit autonomic application specialization, using a common message bus, an agreed upon election process, and an agreed upon extensible configuration and task allocation message format. A common message bus might include a publish subscribe system or other shared message queuing system.

In the technique of the present invention, each server in a deployment registers with the common message bus, communicates on various channels, asserts elections, identifies an elected leader, provides custom configurations, supports task direction and survives the transient nature of software, hardware and networks. Channels are often called "topics". They provide high-level classification of message types. If the protocol does not support it, then the messages themselves can.

Election of a Taskmaster

Figure 2:
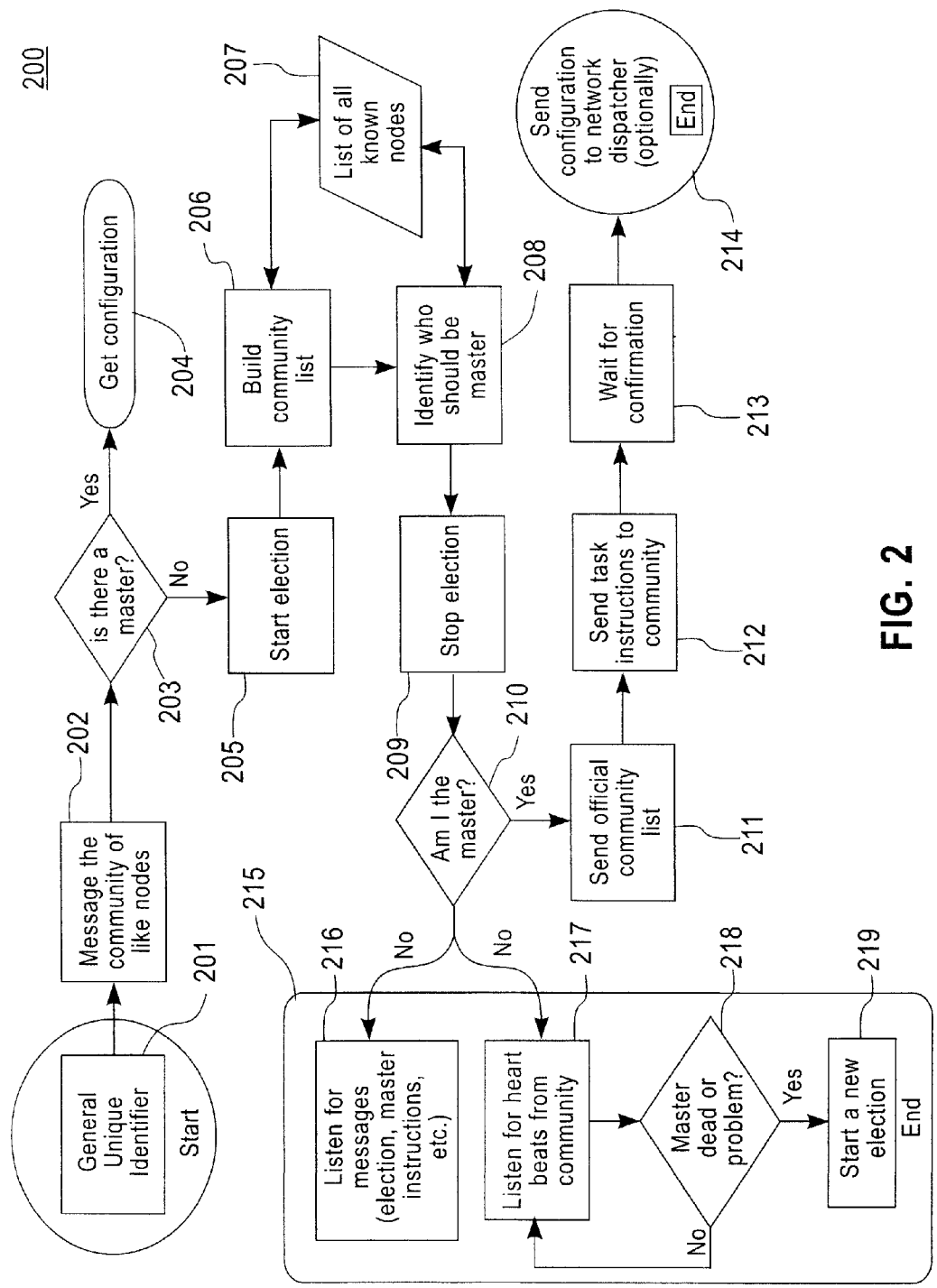
FIG. 2 shows a flowchart 200 of an exemplary embodiment of the present invention.

FIG. 2 shows in flowchart format 200 an exemplary embodiment of a key technique of the present invention, in which one module is elected as the "taskmaster" for the community of currently-deployed modules and retains that status until it drops out for some reason. For purpose of the following discussion, it is assumed that three modules A, B, and C are three enterprise application modules interconnected by a community bus on a network. It is noted that the term "leader" is also used in this discussion to mean the same as "master", and these two terms are used interchangeably in the following discussion.

In step 201, a newly-activated module (e.g., module A) exercises its capability to be identified by a unique identifier. For example, a convenient and exemplary identifier scheme might be the node's UID. In step 202, module A broadcasts its presence on the communal bus and, in step 203, asks whether a master module already exists. If such master exists, in step 204, module A gets the current configuration (e.g., modules B, C) from the master module of modules currently active.

If module A does not receive acknowledgement that a master already exists, in step 205, then module A declares an election process.

The election process begins by first establishing, in step 206, a list of currently-active modules. Upon receiving the election notice, each currently-active module broadcasts its presence on the community bus so that, in step 207, a community list (e.g., A, B, C) is developed by each currently-active module.

In step 208, each module uses a predetermined algorithm to determine which currently-active module will become the leader. For example, the selection algorithm might be that the module associated with the lowest UID will be elected as leader, so that by step 210, each module will have determined whether it will serve that role.

It is noted at this point that, although the concept of a lowest UID is used for discussion, any number of other selection algorithms could be used, and the present invention is not intended as being limited by this specific technique. A number of alternative implementations of this function would be obvious to one of ordinary skill in the art, after taking the present disclosure as a whole, and various non-limiting variations are suggested later.

In step 211, the elected leader executes its administrative task of transmitting an official community list and, in step 212, transmits task instructions to the community and awaits confirmation, in step 213. In step 214, the master module optionally also communicates the current configuration to a network dispatcher.

Sequence of steps 215 shows how the community of modules A, B, C continuously monitors the community to determine whether the master module is still present. In steps 216 and 217, each module, itself sending out a heartbeat to the community to announce its presence, also listens for messages and heartbeats on the community bus. In step 218, should a module detect over a predetermined time interval, exemplarily defined by a timer function, that the current leader is no longer present, as evidenced by failing to receive messages from the leader, in step 219, that module declares the need for an election to determine a new leader.

Table 1 below contains an exemplary listing of channel communication modes on the community, as exemplarily discussed in the flowchart of FIG. 2 to achieve the process of the present invention.

TABLE 1

Potential channel/topics for communication

| Channel/Topic | Message Type | Description |
| --- | --- | --- |
| /{Application Name}/ configuration | 1 to n | Elected server uses this to communicate configurations |
| /{Application Name}/ ping | n to n | Acts as a heartbeat; absence can be used to force an election |
| /{Application Name}/ {UID} | 1 to 1 | Allow common one to one messaging |
| /{Application Name}/ election | n 2 n | Segments election traffic |

Figure 3:
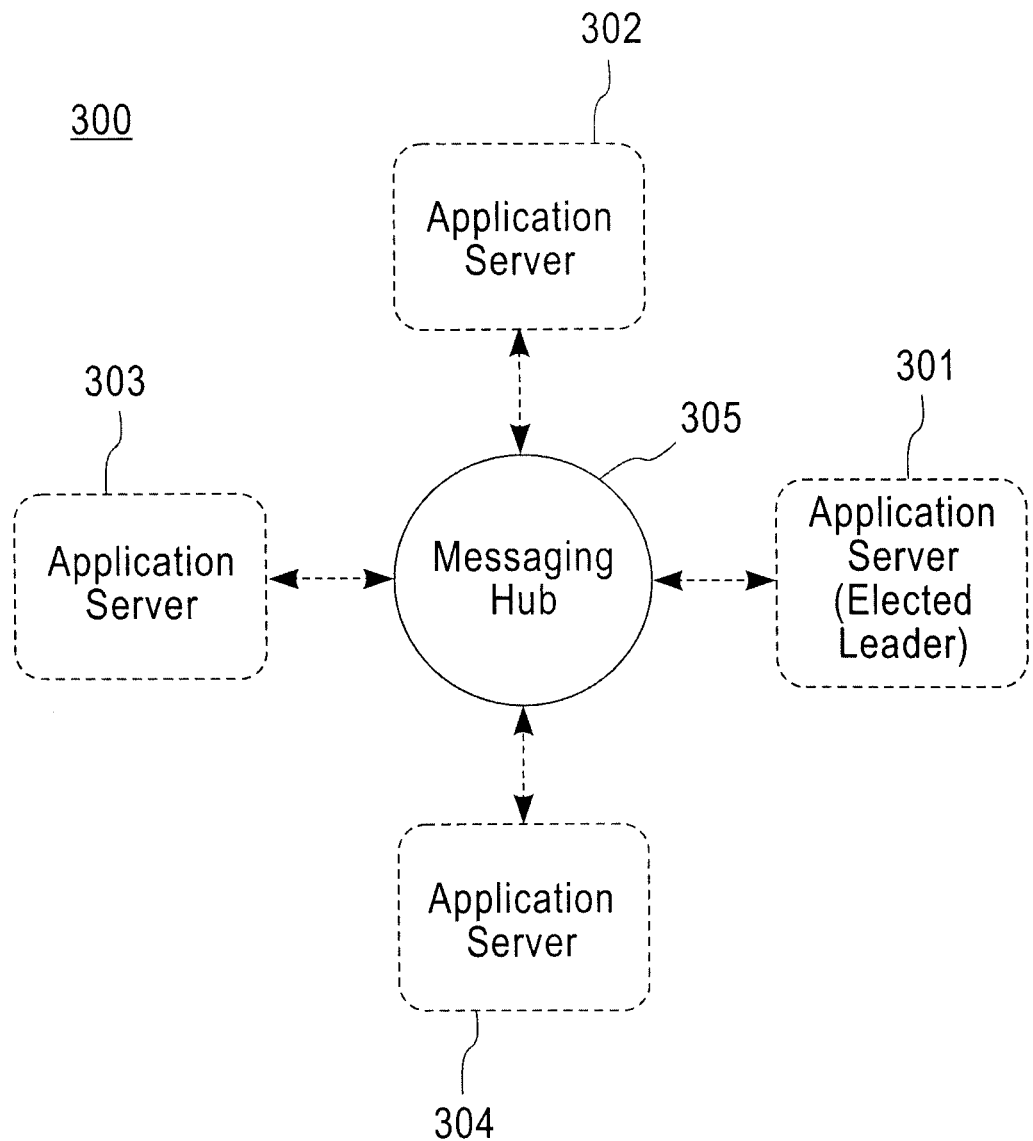
FIG. 3 exemplarily shows an autonomic application structure 300 in accordance with the present invention.

As a specific example of the present invention, FIG. 3 illustrates a scenario 300 in which it is assumed that one server, in a cluster of four servers 301-304, needs to run a scheduled data feed process. It is not desirable for each server in a cluster to run this task, since there is risk of task collision and might introduce additional unwanted network traffic or database activity. Each application contains the same code base. The code base contains all the necessary functions to manage sending, receiving and processing messages.

Figure 4:
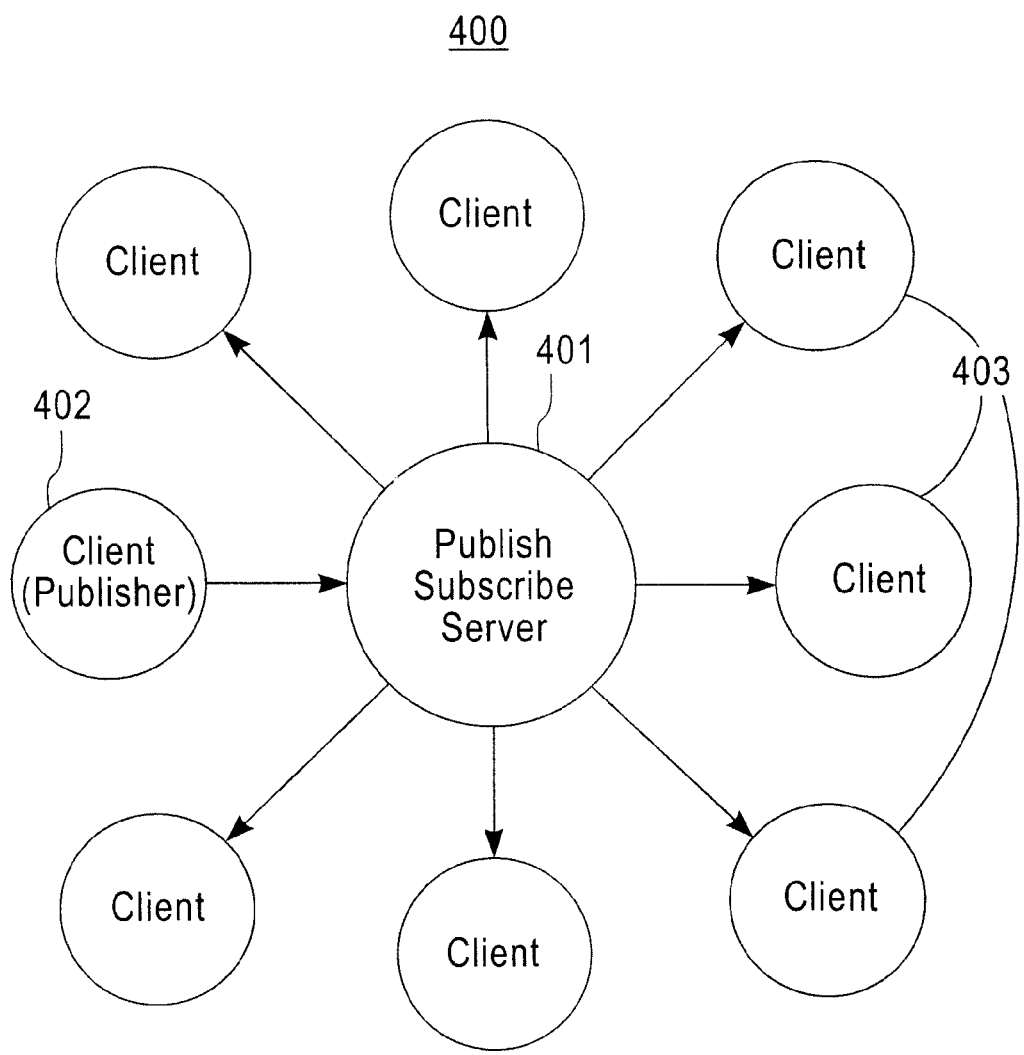
FIG. 4 exemplarily shows a task class structure 400 in accordance with the present invention.

It is assumed that each of the four servers (nodes) connects to a publish-subscribe server 305 (e.g., messaging hub). The publish/subscribe server 305 relays messages from one to many listeners, as shown in FIG. 4. This infrastructure is highly scalable and supports clustering for failover and load balancing.

FIG. 4 shows a typical publish/subscribe server configuration 400. The broker 401 can be implemented in many different ways. The primary responsibility of the broker 401 is to transmit messages from one or many publishers 402 to one or many listeners/subscribers 403. In order to accomplish this task, the broker 401 requires knowledge of all the topics, listeners/subscribers 403, and publishers 402. In addition to this core data, user access controls are required to govern the broadcasting of messages or listening to topics. The broker 401 may use hash tables to store IDs, topics, subscribers, and access controls.

When a publisher 402, which could also be a listener/subscriber 403, wants to send a message, a "publish message" is created and transmitted over a socket connection between a first system and the broker 401. As part of the transaction, the broker 401 validates the identity and authority to broadcast of the publisher 402 and only then transmits the message to every listener/subscriber 403.

The methods by which to broadcast efficiently to listeners/subscribers 403 are well known to the art. The most basic, and unfortunately inefficient method, is to cycle through the list of all listeners/subscribers 403 and broadcast to each listener/subscriber 403 in turn. Furthermore, listeners/subscribers 403 initiate the relationship using a socket connection and upon successful registration subscribe to topics of interest. Topics might be defined as part of a configuration or dynamically generated upon connection or publishing. Root topics are often required to be formed in the configuration. Access controls are often managed through configuration files.

As already discussed in the flowchart of FIG. 2, a common heartbeat message is sent as part of participating in the system. The heartbeat design pattern is a cooperating exchange of messages identifying presence to necessary parties. Other potential message types are listed in Table 1.

Also as shown in the flowchart of FIG. 2, after being identified as part of the system, a module is considered dead if a heartbeat is not received within a specified time period. Each node arriving on-line begins asking if there is already a leader. If there is not a leader, then any one of the clients can assert the need for an election.

The election requires each node to send a message with a unique identifier and any information that will be used to identify the leader. Exemplary identifier schemes might be based on random numbers, GUIDs, or server attributes. GUIDs are globally unique identifiers. GUIDs are random character strings with a very high likelihood of not being repeated in the network.

The election process lasts for a finite amount of time. The elected leader then communicates the follow-on messages identifying servers to match tasks and distributing any configurations. If a node joins after the election has taken place, even if that node would have been the leader, it does not become the leader. Each node maintains a list of live nodes. If the current leader dies, then any one of the remaining nodes can assert the need for a new election.

Table 2 contains a dialogue of a simulation of the present invention that demonstrates the implementation of the system, method and architecture shown in FIG. 2. Out of convenience, it does not use a network-based publish subscribe function. Rather, the relative functional aspects have been replicated via a common local message broadcast system.

Leader Election

In Table 2, each node in this implementation has been initialized by selecting a positive random long value using the common Java™ math APIs (the largest value for long is 9,223,372,036,854,775,807). This random long value becomes the node's unique identifier (UID).

Leader selection begins with a node creating an election message. The message contains the UID of the node sending the message. A timer is set to stop the elections after a predetermined number of milliseconds. For demonstration in Table 2, this value is set to thirty seconds (30,000 milliseconds).

As each node receives the election message, it is programmed to then calculate which node is the leader. This calculation is done by treating the node UID as a number. In an exemplary simple scenario, after the specified time period has elapsed, the smallest UID has been elected the leader. The leader creates and sends a message with a task. The task specifies which node(s) should run the task and any required configuration settings.

Late Joining or Transient Nodes

It is possible that a node is removed from the network or simply misses the time window for leader election. All nodes are programmed to begin by requesting the current leader and node list. If a leader exists, then the node list will be propagated. If no list is received, the node then starts an election. Assuming the node is joining an existing ring with an elected leader, even if the new node would have been leader, it acts as any other node. Leadership election will not run until the current leader is absent from the network or another node asserts the need for a new election.

Task Identification

In the simplest case, there is only one task that is required to run. For purpose of demonstration, the leader might, for example, assign the smallest UID as the task runner. While, in the example using the exemplary decision rule that the smallest UID serves as a master, this is most often the leader, it is possible a late joiner with a smaller UID is assigned the task.

Module Components

Figures 5, 6:
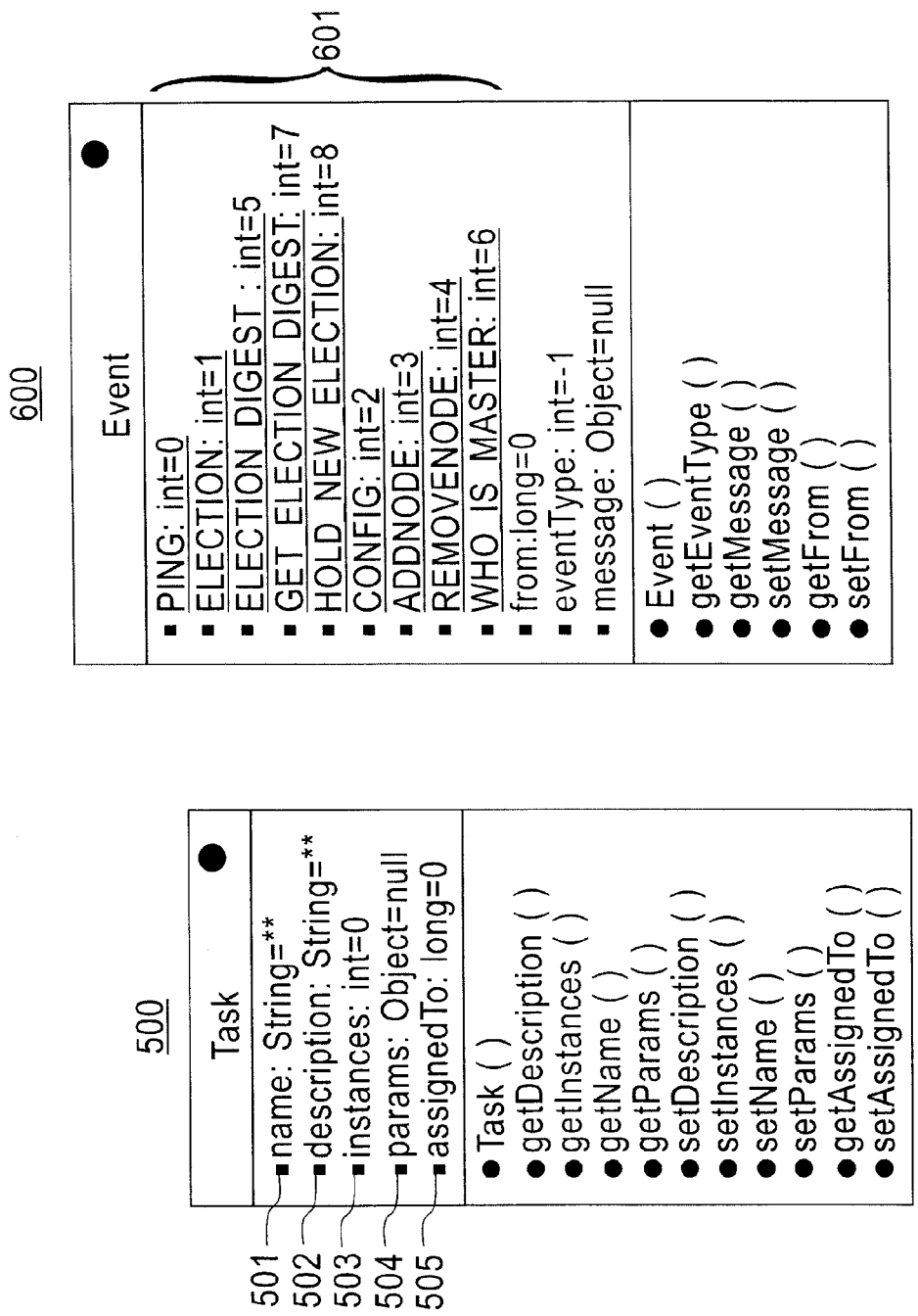
FIG. 5 exemplarily shows an event class structure 500 in accordance with the present invention.
FIG. 6 exemplarily shows a system class structure 600 in accordance with the present invention.

As exemplarily shown in the Task class structure 500 of FIG. 5, important elements related to a task that the leader might set include the name of the task 501, the task description 502, how many computers should be running it 503, the parameters needed for initialization 504, and which nodes are assigned to this task 505. The exemplary Task class diagram 500 shows AssignedTo 505 defined as a long, but this entity could easily be an array of longs or other data structure.

The Event class diagram 600 shown in FIG. 6 shows that Event can store a task 601 as part of the message. Because all nodes are capable of being a master, configuration is done once and any node is able to run an election, identify nodes and assign and configure tasks.

Figure 7:
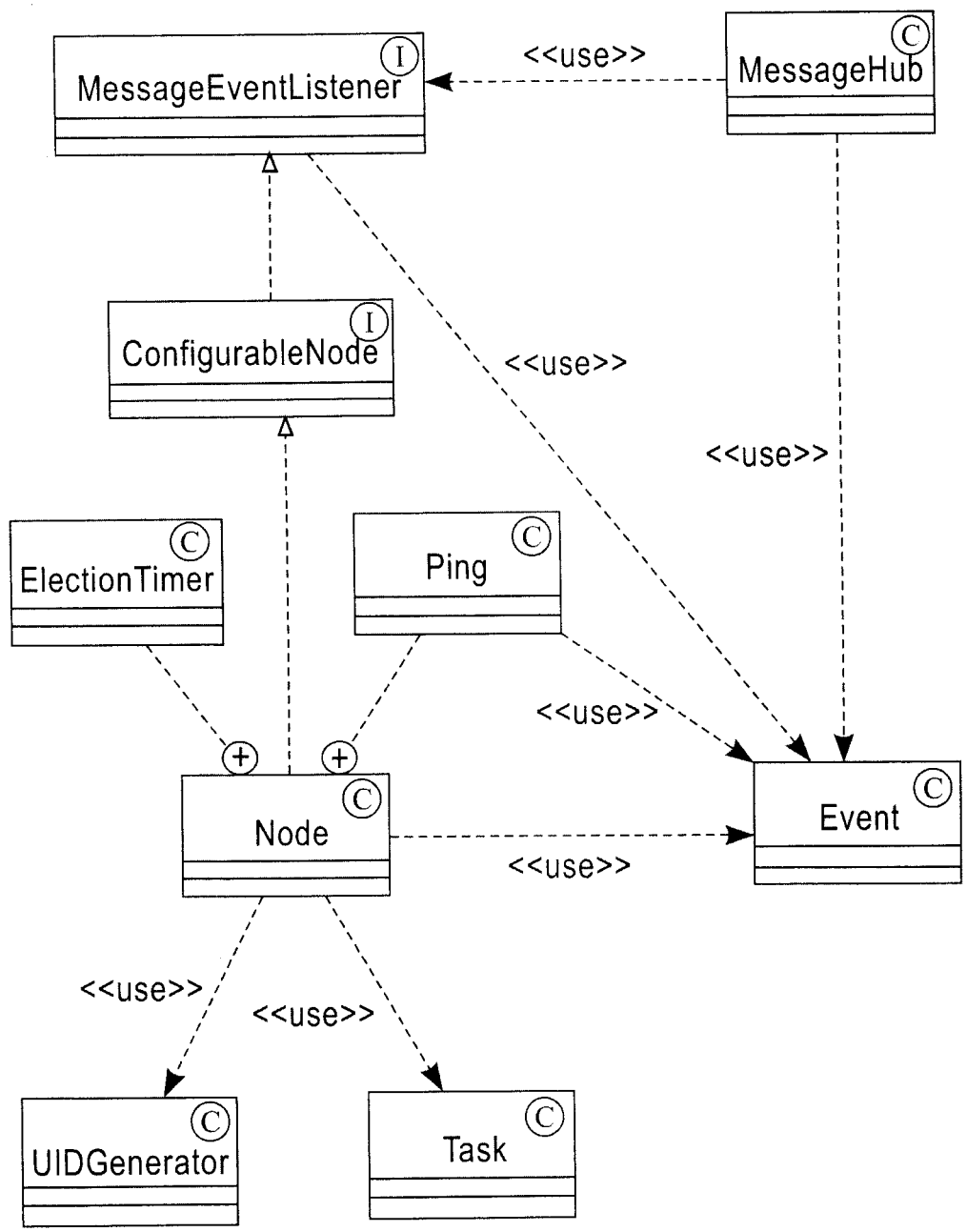
FIG. 7 exemplarily shows an application configuration 700 that runs a single instance of a database maintenance module.

FIG. 7 shows the components of an exemplary system definition, wherein systems are made up of one or more modules to accomplish a common task. FIG. 7 describes the system in the UML (Unified Modeling Language) (blue prints for those skilled in the art). The figure describes not only the components but the relationships between the components. FIG. 7 identifies all the components, specifically a Node, Messaging Hub, Event and Task. Moreover, Nodes know (are made up of other components) how to Ping (heartbeat) Time an election (ElectionTimer), generate GUIDs (UIDGenerator), register for messages (ConfigurableNode, Message Event Listener).

One caveat is that the number of instances should be less than or equal to the current unique tasks. It would be possible to configure a task that needs to happen on ten nodes, but only five are available. Moreover, it might be possible for every node to have a bad connection to the publish subscribe server, in which case the application is not defined.

Demonstration

A demonstration of the dialog shown in Table 2 can be run as a standalone Java application. The application is an implemented version of the class diagram seen in FIG. 7. A total runtime is approximately 30 seconds. An output of this application can be viewed in Table 2. It is noted that FIG. 2 presents this log in flow chart form.

In the exemplary dialogue of Table 2, the application begins by creating three nodes A, B and C. Each node is considered a standalone application, a node being the mode generic component made up from whatever a node is made. A deployment usually refers to the nodes being set up in a scalable manner, but more importantly an environment where developers are no longer changing the node. Each node identifies itself at the beginning of the transcript, at lines 1-3 of Table 2. On lines 4-6, each node is broadcasting its heartbeat message. The transcript outputs ping instead of heartbeat. Node A identifies that there is no leader yet, at line 6. The transcript outputs master instead of leader.

From lines 11-14, it can be seen that nodes C and B are able to detect that they are not going to be leaders. The election is declared over at line 15 by Node A. The nodes stop worrying about the election, unless they are the best fit of the decision algorithm. At line 17, Node A knows it is the leader. On lines 18-20, Node A sends the current node list. The transcript outputs an election list instead of a node list.

On line 23, Node A sends a task message. The task's title is "Synch Data" and it has been assigned to the UID of Node A itself. Node D joins late on line 26. Node D sends a message checked to determine if it is joining an existing ring, at line 31. Node D receives confirmation that there is already a node list, as seen ending at line 36.

At lines 40-41, Node A detects that the new node D joined and sends out the new node list. Node D acknowledges there is a leader and that even if it were to have been a part of the ring from the start, that it would not have been the leader (lines 42-43).

On line 49, Node A terminates early to test the failover scenario. Node B detects the condition at line 55 and initiates an election on line 59. It is noted that Node A is no longer sending heartbeat messages. Therefore, Node D acknowledges it is the new leader on line 74.

EXAMPLES

Figure 8:
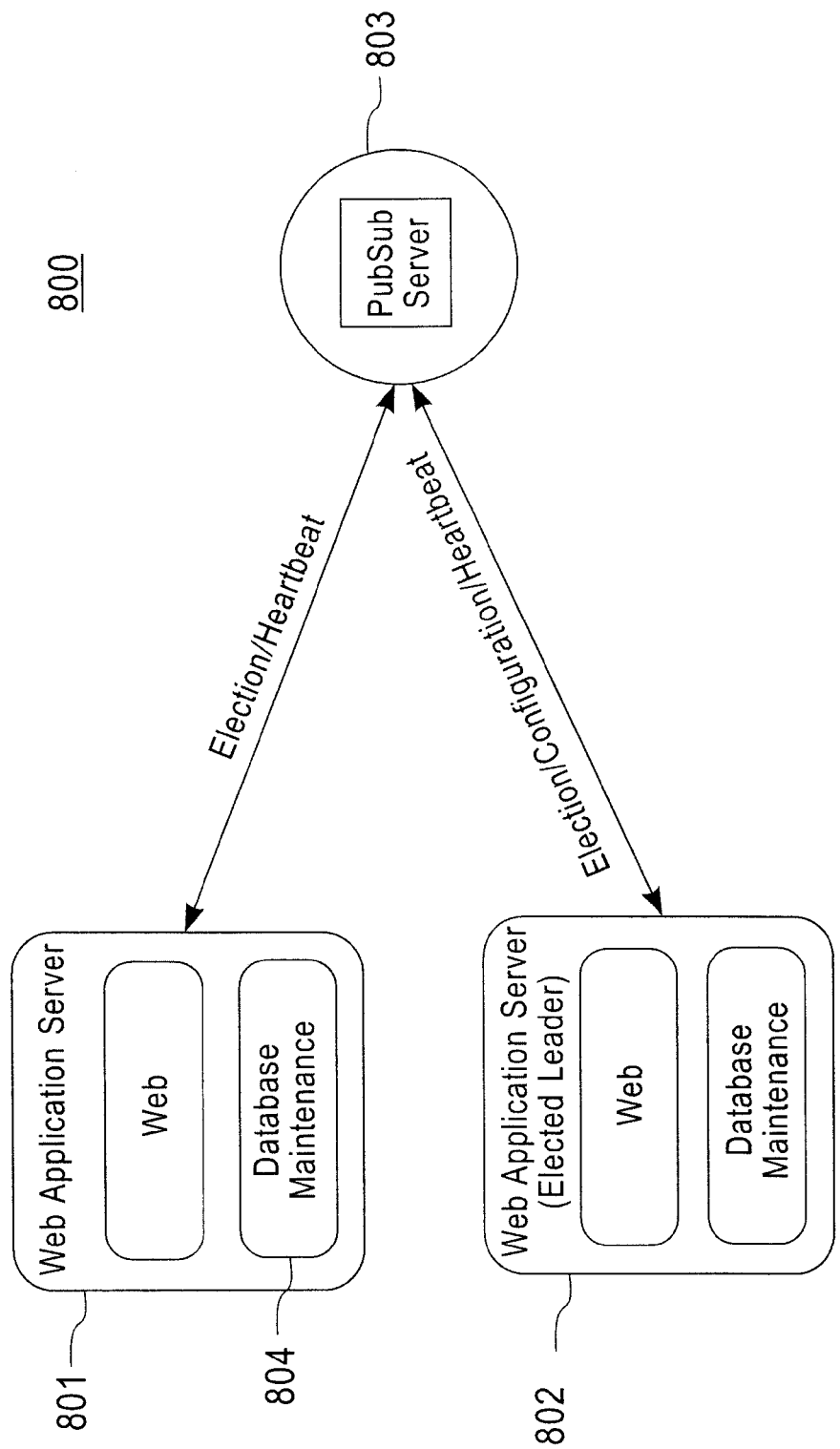
FIG. 8 exemplarily shows an application leader election and configuration with a network dispatcher 800.
Figure 9:
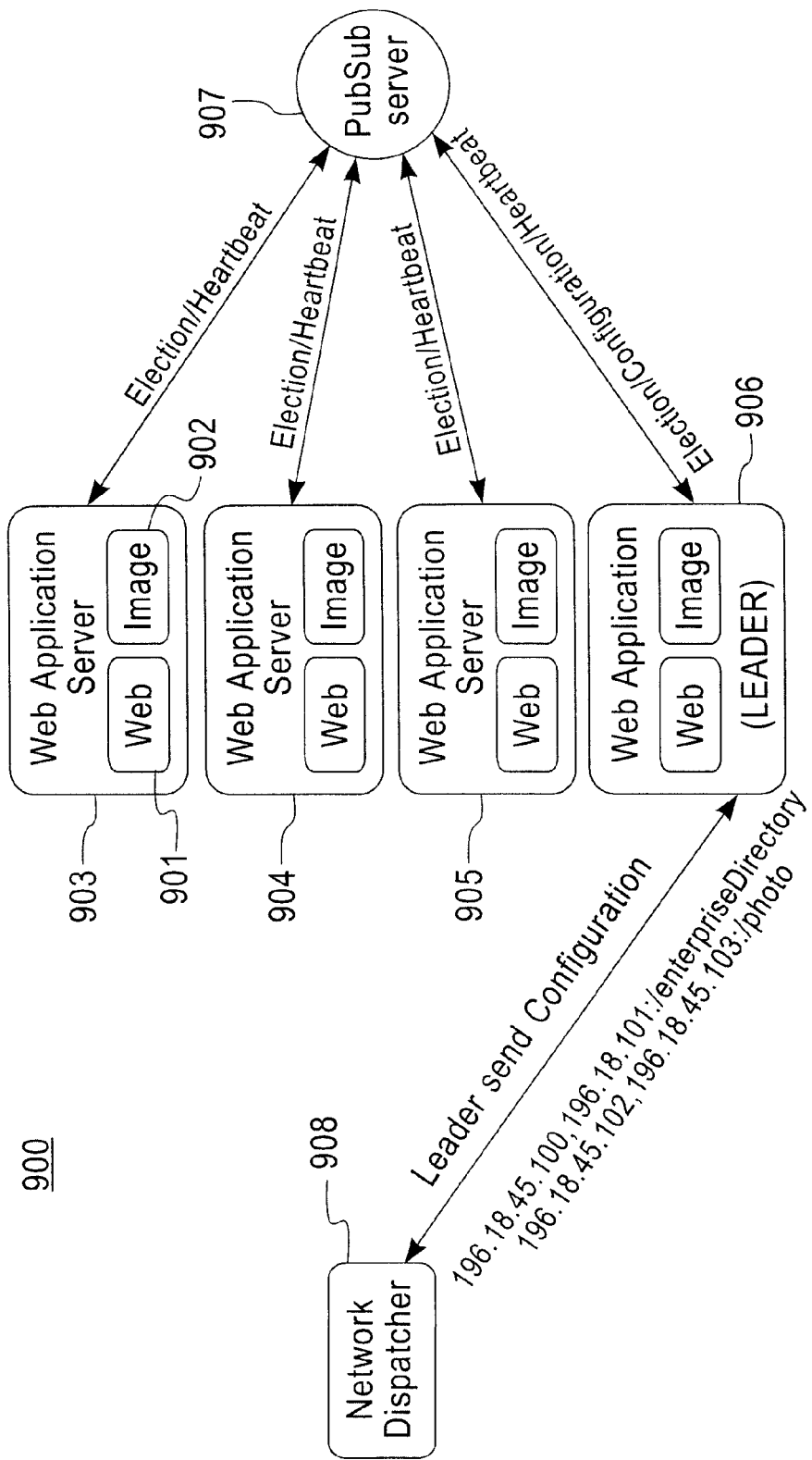
FIG. 9 exemplarily shows a network dispatcher response 900.

Two examples will now be discussed, as shown in FIGS. 8 and 9, as examples of implementations of enterprise applications that incorporate the present invention. The first example, shown in FIG. 8, demonstrates the automatic configuration of a typical application deployment to run one, and only one, instance of a particular sub-system. The second example, shown in FIG. 9, demonstrates the automatic time based configuration where application servers change in real time and update a network dispatcher type infrastructure to handle known changes in the environment.

Example 1

An enterprise application is often made up of core application components such as http, application, and database servers. Much of the application logic resides at the application server layer in servlets and EJBs. Moreover, there are often components that are written as one-off applications that provide additional function(s) beyond the obvious scope of the application architecture, for example, database maintenance, system cleanup or metrics. The following example describes a basic scenario using the present invention to address this latter component.

Most database driven web applications require some level of asynchronous data maintenance process. The task is thought of as separate from the general application because it focuses on the backend data. For example, databases often require some maintenance—data import, removal, update or synchronization. Another reason to build and deploy these applications as one-off standalone solutions is that in highly scaled deployments it is preferable to have a single instance running the data maintenance. Multiple instances might cause data corruption or poor performance.

FIG. 8 depicts an exemplary scenario 800 in which two application servers 801, 802 are connected to a single publish/subscribe server 803. Each application has participated in the leader election process and the bottom application server 802 has won. The elected leader 802 has selected itself as the application server to run the database maintenance sub-system and sent the configuration to the other application server. The top application server has disabled its database maintenance sub-system 804.

This example of FIG. 8 illustrates one example of how this system enables common development, deployment and autonomic management. It achieves a single running instance of a given sub-system, yet maintaining automatic failover and common development and deployment. Other examples of this invention include application driven configuration and load balancing.

Example 2

An enterprise application is often made up of several layers; web/html, control servlets and EJBs for example. The following example shown in FIG. 9 describes a possible scenario using the disclosed invention.

A common service in any enterprise is the business name and address book, or directory. While the data is often stored in an LDAP server, a web front end is often built to support the viewing and management of the data. It is not uncommon for personnel records to include images; however storing images in LDAP introduces performance issues. Images are often stored in a file system or a specially tuned database. In the following example, the application being deployed is made up of two components; the web interface 901 and the image service 902.

FIG. 9 describes a snap shot in time of the entire system coming online. There are four application servers 903-906, a pubsub server 907 and a network dispatcher 908. Network dispatchers load balance between servers. If a server becomes unresponsive, then the network dispatcher 908 will automatically stop directing traffic to that server.

In FIG. 9, the bottom application server 906 has been elected the leader. It has communicated the configuration to the other servers. Two servers 903, 904 are hosting the web application and two servers 905, 906 are hosting the image service.

After the leader 906 has configured the system, it communicates the configuration to the network dispatcher 908. Two servers 903, 904 will support Enterprise Directory requests and two servers 905, 906 will support image requests.

Figure 10:
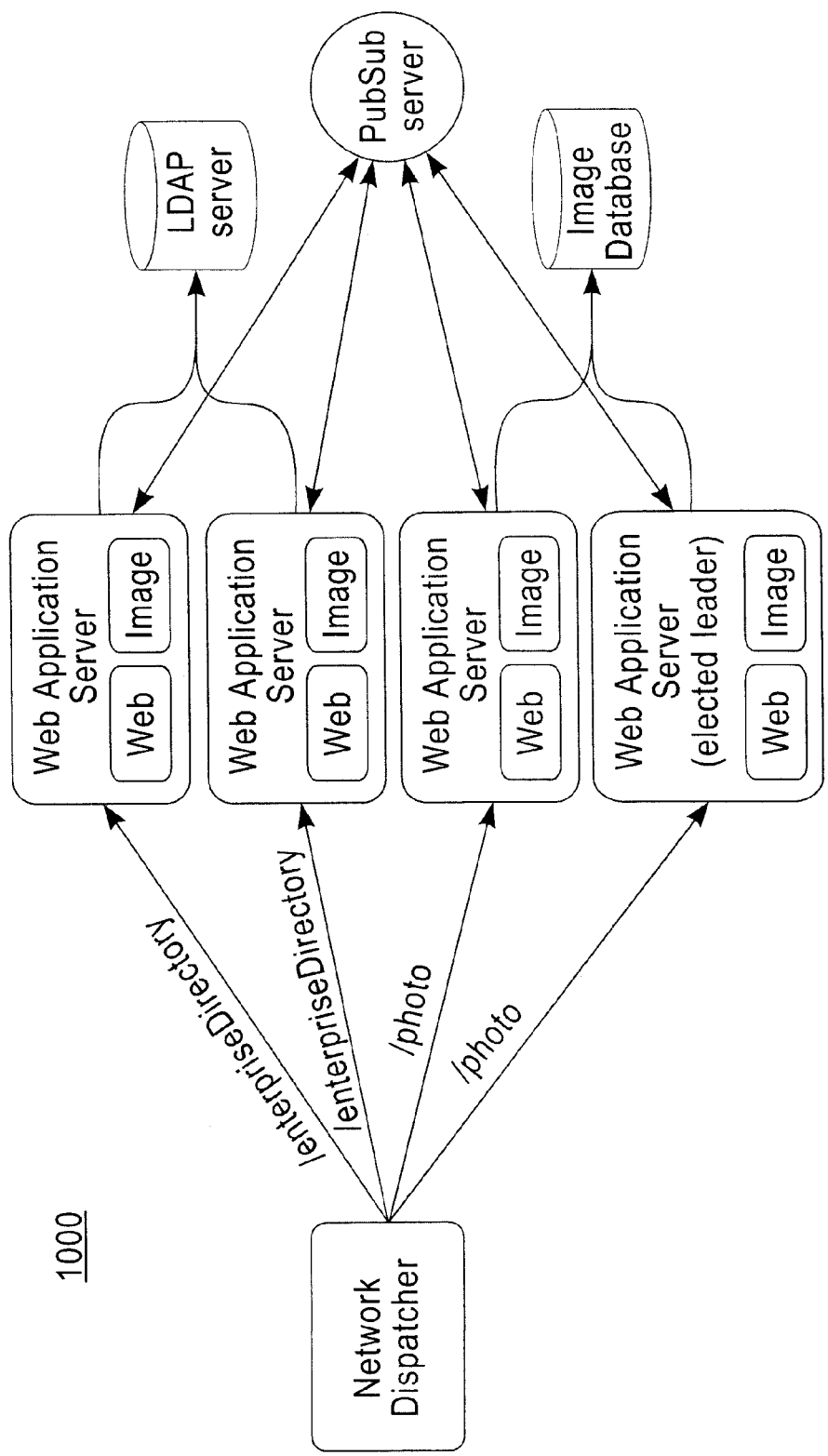
FIG. 10 shows an exemplary reconfiguration 1000 of adding another image server.

FIG. 10 exemplarily illustrates the normal response to the configuration. Traffic is load balanced between two clusters of two servers. There are times during the day when an application receives more load than other times. In the case of this application, during the hours of 9 AM and 1 PM the application receives more transactions to the image service. Many other applications require its availability during these hours.

Figure 11:
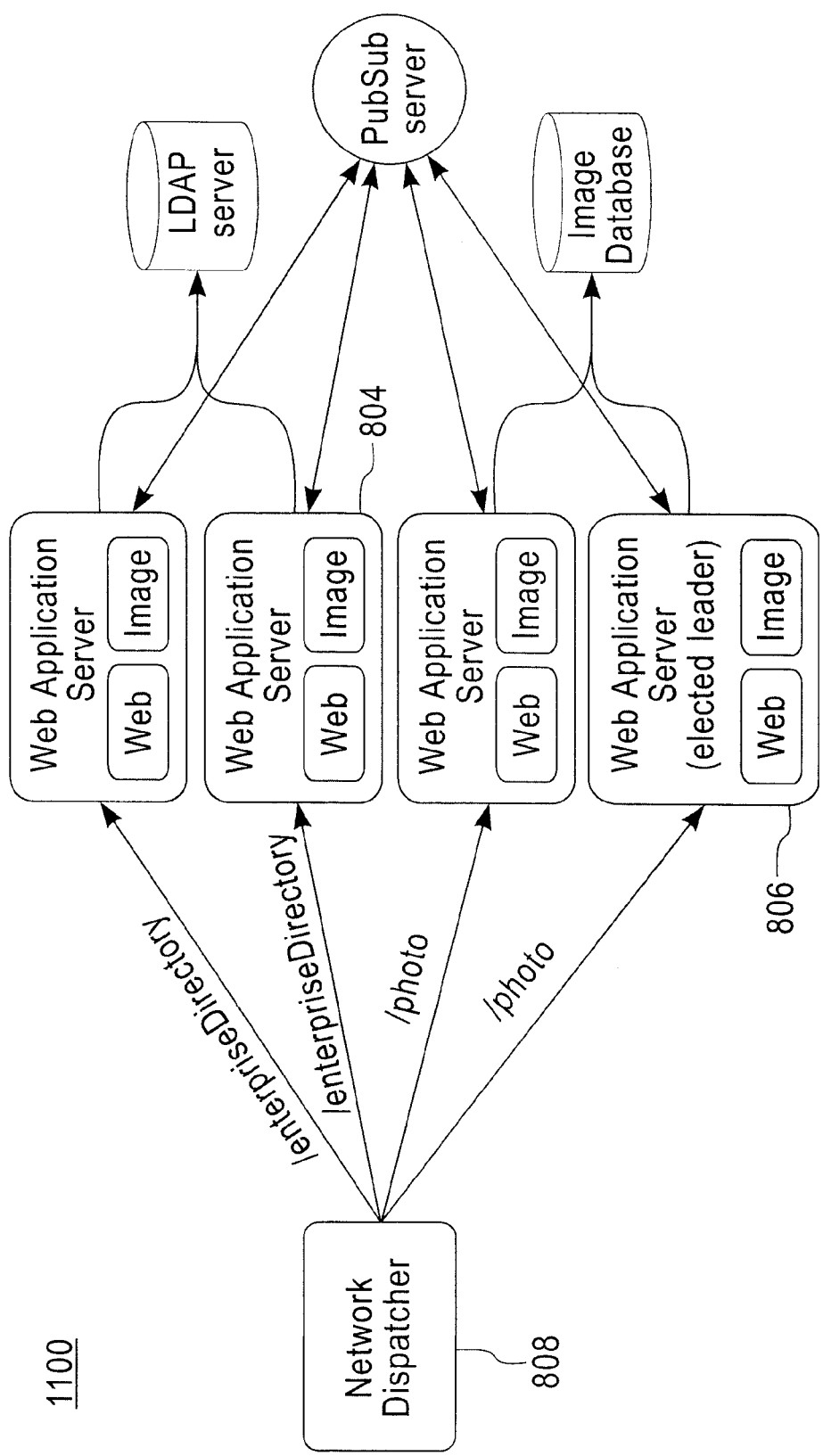
FIG. 11 exemplarily illustrates a generic publish subscribe system 1100 in a hub and spoke topology.

The elected leader 906 periodically checks the time to see if the current time is between 9 AM and 1 PM and, if so, it configures another server 904 to support the image service, as shown in FIG. 11.

The elected leader then sends the new configuration to the network dispatcher 908. After the time window passes, the elected leader 906 again reconfigures the application and notifies network dispatcher 908 of the change in configuration.

This example in FIG. 11 illustrates one example of how this system can be used. Other examples include moving CRON based tasks to the application server. Applications need to be able to configure and reconfigure to enable a more flexible runtime environment. Supporting common development, deployment and autonomic management is realized through this model.

Thus, for example, returning to FIG. 1, the present invention would allow the CRON Job 111 in server 104 to be implemented in application servers 105,106 and/or would allow application servers 105,106 to be incorporated as modules in server 104. As such, by incorporating the autonomous enterprise applications of the present invention, front end server 104 becomes an autonomously reconfigurable (e.g., no user intervention required) server, thereby both adding flexibility and possibly reducing the number of components in the system.

There are numerous variations possible to the basic technique exemplarily discussed above. A number of non-limiting variations are discussed below, but these variations are not intended as exhaustive.

Thus, for example, although this disclosure describes autonomic application differentiation in finite time, using $n''$ messages for leader election, task and configuration assignments, where n equals the number of participating nodes, there are numerous papers addressing more efficient leader election algorithms. Since the present invention potentially supports all of these approaches, the exemplary embodiment discussed herein should not, therefore, be considered as limiting the present invention to this specific form of leader election.

In a broader interpretation, the present invention could be viewed as a method of differentiating, in an automatic fashion, one or several nodes of identical makeup that can be interconnected through a common message medium, such as, for example, a bus. The method would typically include connecting to the common message bus and transmitting a message on the common message bus to establish a presence and to determine a current environment. In accordance with the discussion above, if necessary, an election process is conducted to determine a primary node among the nodes, and the primary node thereinafter sends a configuration message to nodes currently connected to the common message bus.

In a specific implementation, one or more of the nodes might comprise multiple applications, each capable of communicating on a local bus. The common message bus might be any of a message queuing server, publish/subscribe server, RAM bus, wherein communication is facilitated through Random Access Memory by writing and reading memory registers, Transmission Control Protocol/Internet Protocol (TCP/IP) bus, wherein communication is facilitated through socket communications leveraging the TCPIP protocol, hardware bus or other method of communicating between one node and at least one other node.

The message transmission might be formatted in a self-describing markup (e.g. XML) format such as SOAP (Simple Object Access Protocol) or other serialized objects where representations of objects stored in memory can be written out in human readable form and structure.

Determining the current environment might include one or more of the detection of an existing master, the existence of a local node network, the existence of a quantity of nodes or any other attribute unique to the environment accessible to the node including properties passed in through the command line, existing variables such as current operating system, display type, hardware type, machine type, subnet, gateway or other property.

The election process might be performed by "flipping coins" or other random process, passing a token in "round robin" fashion, or by selecting a particular element out of a set of known alternatives. For example, a list or set of known nodes known by all nodes and each node my decide to vote for a given node. The node with the lowest votes is eliminated and an election is repeated. The process continues until only on node is elected. This system is relatively complex if the random selection is based on random number selection and not a more complex formulae but it demonstrates how a known set can support the selection of a leader.

The configuration sent to each of the nodes could be identified as being specific for a node and/or could include instructions to perform follow-on tasks. These follow-on tasks might include transferring code from a second system to the node system for installation and configuration. The examples above are focused on the enabling or disabling of specific features or functions in a generally heterogeneous environment. Additionally, tasks might include procedures to execute.

For example, the master node might require new code to be downloaded and distributed to each node. The node configured for this task might also receive a message with the URL of the code intended to each node. The configured node understands this message and identified the URL as the end point for retrieving code and beings transferring the data. When the transfer is complete, the node transfers it to all the other configured nodes, managing which servers have which code level and which are on-line and offline. Master servers and configured nodes are capable of sending and receiving additional messages to support more complex tasks. In this example, the master and configured node automate code updates or resource distribution (e.g. files such as archives or images).

From another perspective, the present invention could be considered as being a method of detecting leader failure through distributed monitoring, wherein at least two nodes currently on-line, a first and second node, detect a third node as the current leader node. The first node monitors the third node by requesting presence of the third node. The second node independently monitors the third node by requesting its presence. If the second node, for example, is the first to determine that the presence of the third node has been compromised, it then communicates to other nodes, including the first node, of this new state in which the leader is no longer present.

In a variation, it is possible that there could be more than one leader specified for different domains, wherein a domain is a well defined area of understanding and only one leader of such domain could exist, and/or it could be that the method of the first node monitoring the third node is not the same method used by the second node. All nodes currently on-line might monitor the other nodes, regardless of leader status.

For example, a domain might include managing the configuration of dynamic image serving as described earlier. More than one server might be required to provide the feature, However, only one master is required to make the configuration. In this case, the master would be the dynamic image serving master. Another function for the same cluster might be the network dispatcher configuration function. This function could be run once and only once within the cluster. However it is not required that it be run by one master.

Specifically, this function does not need to be managed by the dynamic image serving master. Instead, a new master could be elected for the domain of network dispatcher configuration. This master is concerned only with the configuration of a network dispatcher. If there was a need for the function to be run on more than one node, this master would configure nodes accordingly.

Figure 12:
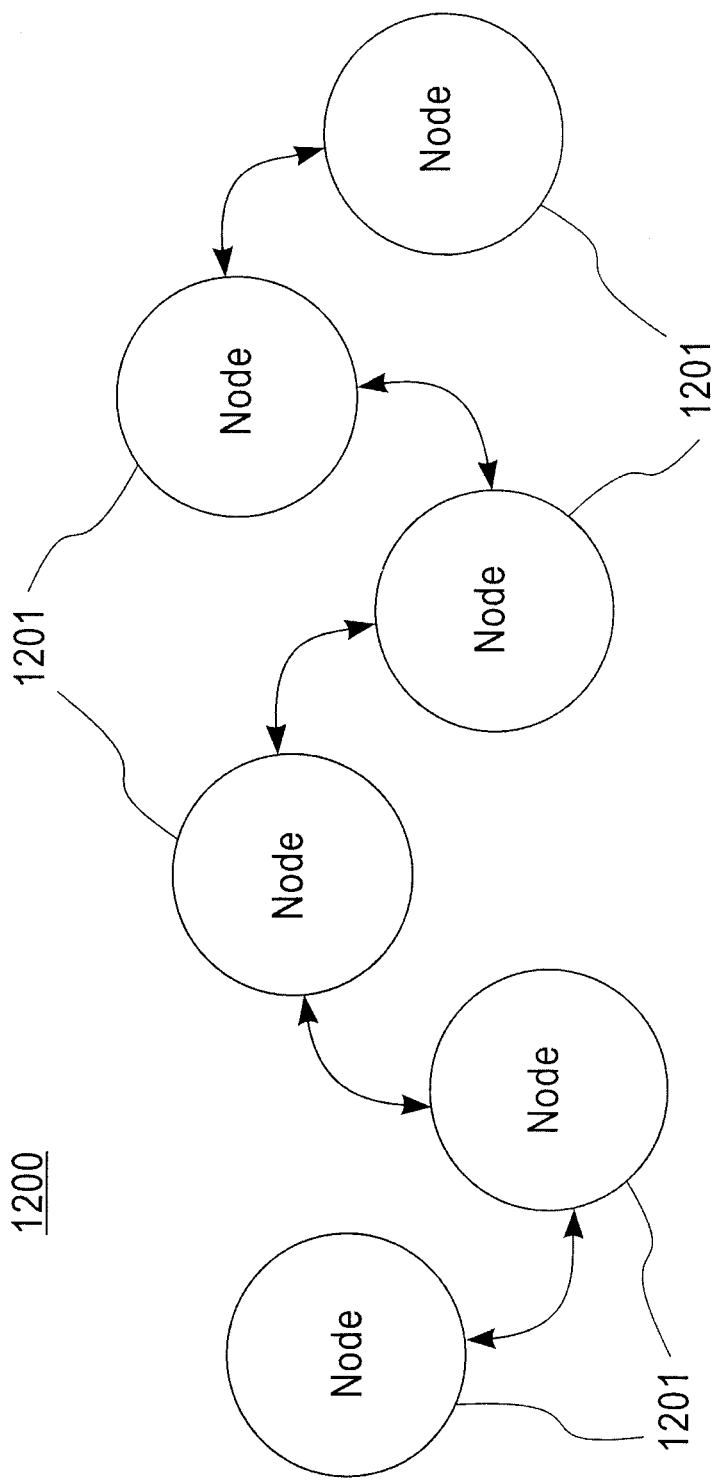
FIG. 12 exemplarily illustrates a configuration 1200 in which nodes 1201 are interconnected, but not by means of a common bus.

Rather than being connected to each other directly via the same common message bus, the nodes might be collectively connected in a technique other than a common message bus. For example, general peer-to-peer techniques could be employed where each node in the network is connected to at least one other node. Each node generates, receives and repeats messages to the peers they know. Each peer stops forwarding the messages based on a TTL ("time-to-live") variable or if the node sent the message to being with or if the message has already been propagated once before. An exemplary configuration 1200 is shown in FIG. 12, wherein all nodes 1201 are interconnected without the use of a common bus.

In this exemplary network topology 1200, there is no need for a central server to act as a message bus. Peers 1201 would typically be seeded with a list of known peers 1201 or a server that knows of all peers 1201 and can distribute Ips.

In yet another variation, the detection of presence might include a summation of a complex state, wherein the "state" might be of mixed quality. For example, the state might mean leader is 60% there, 40% unavailable, for whatever reason. This percentage might be calculated by reading the current level of CPU or RAM utilization. If the utilization of either of these resources is a better indicator of the system's ability to perform work.

So, while the presence of a system might be articulated as having a heartbeat, additional attributes as described make for a better more descriptive metric with which to describe availability or probability of presence and participation. Additionally, if the node in question has been assigned four tasks but has only completed one, then its availability for another task might be less than a node that has completed all of the tasks assigned to it.

The detection of a compromised node or a second compromised node might be determined with a predefined metric, such as the time it takes for a ping message to be responded to. A ping message is like a heartbeat, but it is expected to generate a response from the target node. In this case, the duration from sending and receiving response from a ping might determine if a node is compromised. If the latency is too great, then it might be a sign of deteriorating availability.

The election process might be determined through any one of a collective "coin flip", rules involving the environment, or the result of querying a third system. For example, a common service amongst all nodes might take a list of nodes and return a node for a given leader based on location or hardware profiles. Additional examples were discussed earlier.

In yet another variation, the present invention can be viewed as a method for creating a sortable unique identifier comprised of attributes describing a given node. That is, a UID that describes aspect of a given system is created. The most obvious example could be to take a computer's IP address, CPU, RAM, and disk space, and append it in a string. The IP makes it unique and the other parts provide richer information while still comprising the IP (e.g., 9.24.36.125-1.2 ghz-2 Gig-100 Gig).

A more complicated example would translate each of these attributes into a number which would result in a value representative of the collective whole (e.g., 92436125122100). They could be added/subtracted/given extra points for a second network adapter.

Moreover, the unique identifier might be made up of self-describing markup, such as Extensible Markup Language (XML). That is, considering the examples above and the unique identifier instead of just being a simple string being a document or a string that can be read as a document (e.g.: <uid><ip>9.24.36.124</ip><cpu>1.2 Ghz</cpu></uid>). The attributes describing a node include any of the following: RAM size, CPU speed, disk space, network bandwidth, model number, geographic location, or other environmental condition.

In yet another variation, the present invention could be viewed as a method of holding an n-way election using a publish/subscribe bus that includes the steps of a first node connecting to a publish subscribe bus/and a second node connecting to the bus. The first node initiates an election over the publish/subscribe bus. The second node and a third node receive the election message over the bus. The first, second, and third nodes send messages over the publish/subscribe bus, where in the bus is an abstract version of a publish/subscribe server implying the means for transmitting the message and the technology supporting the transaction is not important, and an algorithm held on each node determines individual nodes of the greater connected whole.

FIG. 13 illustrates a typical hardware configuration of an information handling/computer system in accordance with the invention and which preferably has at least one processor or central processing unit (CPU) 1311.

The CPUs 1311 are interconnected via a system bus 1312 to a random access memory (RAM) 1314, read-only memory (ROM) 1316, input/output (I/O) adapter 1318 (for connecting peripheral devices such as disk units 1321 and tape drives 1340 to the bus 1312), user interface adapter 1322 (for connecting a keyboard 1324, mouse 1326, speaker 1328, microphone 1332, and/or other user interface device to the bus 1312), a communication adapter 1334 for connecting an information handling system to a data processing network, the Internet, an Intranet, a personal area network (PAN), etc., and a display adapter 1336 for connecting the bus 1312 to a display device 1338 and/or printer 1339 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1311 and hardware above, to perform the method of the invention.

This signal-bearing media may include, for example, a RAM contained within the CPU 1311, as represented by the fast-access storage for example. Alternatively, the instructions may be contained in another signal-bearing media, such as a magnetic data storage diskette 1400 (FIG. 14), directly or indirectly accessible by the CPU 1311.

Whether contained in the diskette 1400, the computer/CPU 1311, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

As discussed above, a major benefit of the present invention to modern development environments such as J2EE is the ability to have common development, deployment and management systems. A drawback to conventional methods is that the model often assumes that to scale, exact copies need to be made of the application.

However, as demonstrated above, there is a need to differentiate deployments. Currently, human intervention is required to manage databases or configuration files that provide each instance with specific settings. The present invention provides an architecture, method, process and program code to enable scalable, autonomic application differentiation and specialization.

While the invention has been described in terms of exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

TABLE 2

| Transcript from demonstration |
|---|

1. 02/18/2004, 19:56:10:231: Node A: My UID is: 136426972174189071
2. 02/18/2004, 19:56:10:231: Node B: My UID is: 6800392145792743607
3. 02/18/2004, 19:56:10:231: Node C: My UID is: 9064069684711675276
4. 02/18/2004, 19:56:10:231: Node A: Ping
5. 02/18/2004, 19:56:10:231: Node B: Ping
6. 02/18/2004, 19:56:10:231: Node C: Ping
7. 02/18/2004, 19:56:10:241: Node A :: Making sure I am not joining late
8. 02/18/2004, 19:56:10:241: Node B :: Making sure I am not joining late
9. 02/18/2004, 19:56:10:241: Node C :: Making sure I am not joining late
10. 02/18/2004, 19:56:10:742: Node A: basically no one is master yet
11. 02/18/2004, 19:56:10:742: Node C: there is already master [136426972174189071]
12. 02/18/2004, 19:56:10:742: Node C: I joined late and wouldn't be the master anyway!
13. 02/18/2004, 19:56:10:742: Node B: there is already master [136426972174189071]
14. 02/18/2004, 19:56:10:742: Node B: I joined late and wouldn't be the master anyway!
15. 02/18/2004, 19:56:12:745: Node A: ElectionTimer election is over ELECTION_OVER true
16. 02/18/2004, 19:56:12:745: Node A: New master is: 136426972174189071
17. 02/18/2004, 19:56:13:746: Node A: Looks like I am the master!
18. 02/18/2004, 19:56:13:746: Node A: I am the master and I am sending the election list!
19. 02/18/2004, 19:56:13:746: Node B: Node count: 3: I got an election digest message!
20. 02/18/2004, 19:56:13:746: Node C: Node count: 3: I got an election digest message!
21. 02/18/2004, 19:56:13:746: Node A: sending election list and node count is: 3
22. 02/18/2004, 19:56:13:746: Node A: sending election list and node data is: [136426972174189071, 6800392145792743607, 9064069684711675276]
23. 02/18/2004, 19:56:13:756: Node A: I got my own message for task [Synch Data] and it is assigned to 136426972174189071
24. 02/18/2004, 19:56:13:756: Node B: I am NOT set to run a task!
25. 02/18/2004, 19:56:13:756: Node C: I am NOT set to run a task!
26. 02/18/2004, 19:56:15:238: Node D: My UID is 5598309968912830766
27. 02/18/2004, 19:56:15:238: Node B: Ping
28. 02/18/2004, 19:56:15:238: Node C: Ping
29. 02/18/2004, 19:56:15:238: Node A: Ping
30. 02/18/2004, 19:56:15:238: Node D: Ping
31. 02/18/2004, 19:56:15:238: Node D :: Making sure I am not joining late
32. 02/18/2004, 19:56:15:238: Node B: Node count: 3: I got an election digest message!
33. 02/18/2004, 19:56:15:238: Node C: Node count: 3: I got an election digest message!
34. 02/18/2004, 19:56:15:238: Node D: Node count: 3: I got an election digest message!
35. 02/18/2004, 19:56:15:238: Node A: sending election list and node count is: 3
36. 02/18/2004, 19:56:15:248: Node A: sending election list and node data is [136426972174189071, 6800392148792743607, 9064069584711675276]
37. 02/18/2004, 19:56:15:739: Node B: Node count: 4: I got an election digest message!
38. 02/18/2004, 19:56:15:739: Node C: Node count: 4: I got an election digest message!
39. 02/18/2004, 19:56:15:749: Node D: Node count: 4: I got an election digest message!
40. 02/18/2004, 19:56:15:749: Node A: sending election list and node count is: 4
41. 02/18/2004, 19:56:15:749: Node A: sending election list and node data is [136426972174189071, 6800392145792743607, 9064069684711675276, 5598309968912830766]
42. 02/18/2004, 19:56:15:749: Node D: there is already master [136426972174189071]
43. 02/18/2004, 19:56:15:749: Node D: I joined late and wouldn't be the master anyway!
44. 02/18/2004, 19:56:18:894: Node A: Master is: 136426972174189071
45. 02/18/2004, 19:56:20:236: Node C: Ping
46. 02/18/2004, 19:56:20:236: Node A: Ping
47. 02/18/2004, 19:56:20:236: Node B: Ping
48. 02/18/2004, 19:56:20:246: Node D: Ping
49. 02/18/2004, 19:56:23:891: Node A: Master thread ending early! Testing failover.
50. 02/18/2004, 19:56:23:901: Node A: Master is: 136426972174189071
51. 02/18/2004, 19:56:25:233: Node C: Ping
52. 02/18/2004, 19:56:25:233: Node B: Ping
53. 02/18/2004, 19:56:25:243: Node D: Ping
54. 02/18/2004, 19:56:30:240: Node C: Ping
55. 02/18/2004, 19:56:30:240: Node B: Time elapsed for item: 136426972174189071, −4
56. 02/18/2004, 19:56:30:240: Node B: received new election notice - ELECTION_OVER: true
57. 02/18/2004, 19:56:30:240: Node C: received new election notice - ELECTION_OVER: true
58. 02/18/2004, 19:56:30:240: Node D: received new election notice - ELECTION_OVER: true
59. 02/18/2004, 19:56:30:250: Node B: Holding new elections
60. 02/18/2004, 19:56:30:250: Node C: Time elapsed for item: 136426972174189071, −14
61. 02/18/2004, 19:56:30:250: Node D: Time elapsed for item: 136426972174189071, −14
62. 02/18/2004, 19:56:30:250: Node B: Ping
63. 02/18/2004, 19:56:30:250: Node D: Ping
64. 02/18/2004, 19:56:30:751: Node D: Master is: 5598309968912830766
65. 02/18/2004, 19:56:35:237: Node C: Ping
66. 02/18/2004, 19:56:35:237: Node B: Ping
67. 02/18/2004, 19:56:35:247: Node B: ElectionTimer: election is over. ELECTION_OVER: true
68. 02/18/2004, 19:56:35:247: Node B: New master is: 5598309968912830766
69. 02/18/2004, 19:56:35:247: Node C: ElectionTimer: election is over. ELECTION_OVER: true
70. 02/18/2004, 19:56:35:247: Node C: New master is: 5598309968912830766
71. 02/18/2004, 19:56:35:247: Node D: Ping
72. 02/18/2004, 19:56:35:257: Node D: ElectionTimer: election is over. ELECTION_OVER: true
73. 02/18/2004, 19:56:35:257: Node D: New master is: 5598309968912830766
74. 02/18/2004, 19:56:35:257: Node D: *I am new master!*

TABLE 2-continued

Transcript from demonstration 75. 02/18/2004, 19:56:35:848: Node D: Master is: 5598309968912830766
76. 02/18/2004, 19:56:40:234: Node B: Ping
77. 02/18/2004, 19:56:40:234: Node C: Ping
78. 02/18/2004, 19:56:40:244: Node D: Ping

Having thus described my invention, what I claim as new and desire to secure by Letters Patent is as follows:

1. A method of deploying an enterprise application, said method comprising:
    including, in a set of instructions that is tangibly embodied on a non-transitory memory medium and that defines an instance of said enterprise application as executable by a processor on a computer, a mechanism allowing said enterprise application to autonomously exercise, on each node receiving the enterprise application instance, a node differentiation/specialization function as related to the enterprise application,
    each said instance comprising a look-alike software module as a single set of instructions having a plurality of modules that define an execution of a plurality of different tasks possible for execution by said enterprise application, including a task that each node receiving an instance of said enterprise application can selectively configure itself to execute a different task or combination of tasks of said plurality of different tasks,
    said node differentiation referring to differences in nodes of a plurality of nodes, even though all the nodes are separately executing respective instances of said enterprise application,
    said specialization referring to task specializations relative to the enterprise application, meaning that the look-alike software modules can be selectively configured to define a different task or combination of tasks of said enterprise application for execution by different nodes, to selectively perform different functions defined by the enterprise application.

2. The method of claim 1, wherein:
    said enterprise application defines at least one primary function executable by a single node, each primary function potentially exposed to performing one or more tasks for other, secondary, functions of the enterprise application or for external applications,
    each instance of said enterprise application equally could execute said at least one primary function of the enterprise application,
    the enterprise application includes instructions for implementing a role of a master node of said network to serve as a leader, said master node receiving input requests for the enterprise application and controlling task assignments to all nodes currently implementing and executing said enterprise application for said input requests, including said primary task, and
    said enterprise application additionally includes instructions to autonomously elect a master node from all nodes currently executing said enterprise application and to autonomously detect whether there is no master node currently operating.

3. The method of claim 2, wherein said mechanism further comprises:
    a monitoring function permitting said enterprise application to determine whether any of a currently-active node implementing said enterprise application is currently serving said master node role that supervises said autonomous exercise of said node differentiation/specialization.

4. The method of claim 3, wherein said mechanism further comprises:
    an election initiation function so that, if said enterprise application determines that no currently-active enterprise application node is currently serving said master role, then said enterprise application transmits a request to initiate an election process to determine which of said currently-active enterprise application nodes should serve said role as master.

5. The method of claim 4, wherein said mechanism further comprises:
    an election determination function so that, during an election process, each said enterprise application node is able to determine whether it should serve said role as master.

6. The method of claim 5, wherein said election determination is based on at least one of:
    an attribute associated with one of said enterprise application and a node upon which said enterprise application has been deployed;
    a predetermined random event or simulated random event;
    selecting a particular element out of a set;
    a rule involving an environment of said enterprise application; and
    a result of querying a second system.

7. The method of claim 6, wherein said attribute comprises at least one of:
    a unique identifier associated with a node upon which said enterprise application has been deployed; and
    an attribute describing a node upon which enterprise application has been deployed.

8. The method of claim 7, wherein said attribute describing said node comprises at least one of:
    a size of a random access memory (RAM);
    a speed of a central processing unit (CPU);
    a space in a disk;
    a network bandwidth;
    a model number; and
    a geographic location.

9. The method of claim 3, wherein said election determination function comprises:
    a presence transmission function, whereby each said enterprise application node transmits its presence to any other enterprise application node currently active.

10. The method of claim 3, wherein said monitoring function occurs continuously, including a time subsequent to a completion of said election determination function, thereby allowing said enterprise application to continuously monitor whether said master role is being provided.

11. The method of claim 1, wherein said mechanism further comprises:
    a master function, whereby one of said enterprise application nodes executes at least one task as a master for all currently-active enterprise application nodes.

12. The method of claim 11, wherein said at least one task as a master comprises one or more of:
broadcasting a configuration of a current configuration to all currently-active enterprise application nodes;
for each task requested to be performed, allocating each said task specifically to at least one of said currently-active enterprise application nodes;
defining at least one specific function to be performed by each said currently-active enterprise application node; and
defining a change in said at least one specific function to be performed by each said currently-active enterprise application node.

13. The method of claim 12, wherein said defining a change in said at least one specific function is based on at least one of:
being included in said mechanism; and
a request received by said enterprise application node.

14. The method of claim 1, wherein said mechanism further comprises:
intermittently transmitting a heartbeat to announce a presence of said enterprise application as being a currently-active enterprise application node.

15. The method of claim 14, wherein said mechanism further comprises:
listening for a heartbeat from other currently-active enterprise nodes.

16. The method of claim 15, wherein said mechanism further comprises:
determining, from said listening for a heartbeat from other currently-active enterprise application nodes, whether any of a currently-active enterprise application node is serving a role as a master.

17. The method of claim 14, wherein said mechanism further comprises:
if it is determined that no said currently-active enterprise application node is serving said role as master, then requesting an election process to determine a new master.

18. The method accordingly to claim 1, further comprising transmitting an instance of said enterprise application to at least one node on a network.

19. The method according to claim 1, wherein:
said plurality of tasks comprises one or more tasks related to an automatic selection of a master node from among those nodes receiving an instance of the enterprise application, the master node serving a leader role in the enterprise application to receive input requests for the enterprise application, and
in respect to an input request received by said master node, said master node assigns one of the nodes to autonomously configure itself to execute the enterprise application as applied to said received input request.

20. The method according to claim 19, wherein a node executing an instance of the enterprise application initially sends a request to identify a current master node and a listing of nodes executing instances of the enterprise application and, if no listing of nodes is received, initiates an election process.

21. The method according to claim 1, wherein said enterprise application is implemented in a Java 2 Enterprise Edition (J2EE) runtime environment.

22. A non-transitory, computer-readable, storage medium tangibly embodying a sequence of computer executable instructions that implement the method of claim 1.

23. A method for differentiating, in an autonomic fashion, each node of a plurality of nodes makeup on an interconnected system, each said node storing an instance of a multiple-application module capable of communicating on a local bus, at least one application of said multiple-application module benefiting if executed by only a single node, said multiple-application module capable of having one or more applications disabled at each said node, said method comprising:
connecting to a common message bus;
transmitting a message on a common message bus to establish a presence and to determine a current environment;
conducting an election process to determine a primary node among said plurality of nodes; and
sending a configuration message, from said primary node, to all other said nodes currently connected to said common message bus so that each node autonomously disables applications in said same set of instructions to thereby autonomously configure said node to execute a specific application of said multiple-application module as based on said configuration message,
wherein each instance of said multiple-application module comprises a look-alike software module as a single set of instructions having a plurality of modules that define an execution of a plurality of different tasks possible for execution by said multiple-application module, including a task that each node receiving an instance of said multiple-application module can selectively configure itself to execute a different task or combination of tasks of said plurality of different tasks.

24. The method according to 23, wherein said common message bus comprises one of:
a message queuing server bus;
a publish/subscribe server bus;
a random access memory (RAM) bus;
a Transmission Control Protocol/Internet Protocol (TCP/IP) bus; and
a hardware bus.

25. The method according to 23, wherein said transmitted message is formatted in a self-describing markup language.

26. The method of claim 25, wherein said self-describing markup language comprises Extensible Markup Language (XML).

27. The method according to 23, wherein the configuration sent to each of the nodes is identified as being for a specific node.

28. The method according to 23, wherein the configuration sent to each of the nodes comprise instructions to perform follow-on tasks.

29. The method according to claim 28, wherein the follow-on tasks include a task of transferring code from a second system to the node system for installation and configuration.

30. A computer, comprising:
a central processing unit (CPU); and
a random access memory (RAM) storing a set of machine-readable instructions being executed by said CPU,
wherein said computer is connected to a network and said set of machine-readable instructions being executed by said CPU comprises an instance of an enterprise application, said enterprise application comprising a mechanism allowing said enterprise application to autonomously and selectively exercise a node differentiation/task specialization by enabling a specific role from a plurality of possible roles defined in said enterprise application, such that said computer can thereby selectively be configured for different tasks defined in said enterprise application,
wherein each said instance comprises a look-alike software module as a single set of instructions having a plurality of modules that define an execution of a plurality of different tasks possible for execution by said enterprise application, including a task that each node receiving an instance of said enterprise application can configure itself to execute a different task or combination of tasks of said plurality of different tasks, wherein said node differentiation refers to differences in nodes of a plurality of nodes, even though all said nodes of said plurality of nodes are executing said essentially identical software modules, and wherein said specialization refers to a task specialization, meaning that said essentially identical software modules selectively define different tasks for execution by different nodes.

31. The computer of claim 30, wherein said enterprise application further comprises instructions so that the selective configuration at each node on said network that currently implements said enterprise application is controlled by a single node on said network executing said enterprise application in a role as a currently-serving master node, said master node controlling task assignments of all nodes currently implementing said enterprise application, said role as currently-serving master node being one of the possible roles defined said enterprise application.

* * * * *